(12) United States Patent
Yang et al.

(10) Patent No.: US 11,111,396 B2
(45) Date of Patent: Sep. 7, 2021

(54) TRANSPARENT FILMS WITH CONTROL OF LIGHT HUE USING NANOSCALE COLORANTS

(71) Applicant: C3Nano Inc., Hayward, CA (US)

(72) Inventors: Xiqiang Yang, Hayward, CA (US); Yadong Cao, San Jose, CA (US); Yongxing Hu, Fremont, CA (US); Hua Gu, Dublin, CA (US); Ying-Syi Li, Fremont, CA (US); Ajay Virkar, San Francisco, CA (US)

(73) Assignee: C3 Nano, Inc., Hayward, CA (US)

( * ) Notice: Subject to any disclaimer, the term of this patent is extended or adjusted under 35 U.S.C. 154(b) by 242 days.

(21) Appl. No.: 14/627,400

(22) Filed: Feb. 20, 2015

(65) Prior Publication Data

US 2016/0108256 A1    Apr. 21, 2016

Related U.S. Application Data

(60) Provisional application No. 62/065,314, filed on Oct. 17, 2014.

(51) Int. Cl.
*C09D 5/24* (2006.01)
*H01B 5/14* (2006.01)
(Continued)

(52) U.S. Cl.
CPC ............... *C09D 5/24* (2013.01); *C09D 7/61* (2018.01); *C09D 7/70* (2018.01); *G02B 1/16* (2015.01);
(Continued)

(58) Field of Classification Search
CPC .......... B22F 1/0018; B22F 1/02; B32B 15/04; B32B 15/08; B32B 15/16; B82Y 10/00;
(Continued)

(56) References Cited

U.S. PATENT DOCUMENTS 6,274,412 B1 * 8/2001 Kydd .................. G03G 9/0926
257/32
7,316,741 B2    1/2008 Baldi et al.
(Continued)

FOREIGN PATENT DOCUMENTS

CN    101689568 A    3/2010

OTHER PUBLICATIONS

ChemicalBook, Methyl methacrylate Basic information, Dec. 2008, pp. 1-2.*
(Continued)

*Primary Examiner* — Maria V Ewald
*Assistant Examiner* — Ethan Weydemeyer
(74) *Attorney, Agent, or Firm* — Christensen, Fonder, Dardi; Elizabeth A. Gallo; Peter S. Dardi

(57) ABSTRACT

Nanoscale colorants are introduced to adjust the hue of transparent conductive films, such as to provide a whiter film. The transparent conductive films can have sparse metal conductive layers, which can be formed using silver nanowires. Color of the film can be evaluated using standard color parameters. In particular, values of color parameter b* can be reduced with the nanoscale colorants without unacceptably changing other parameters, such as haze, a* and transparency.

31 Claims, 8 Drawing Sheets

(51) Int. Cl.

| | | |
|---|---|---|
| G06F 1/16 | (2006.01) | |
| G02B 5/22 | (2006.01) | |
| G06F 3/044 | (2006.01) | |
| G06F 3/045 | (2006.01) | |
| C09D 7/40 | (2018.01) | |
| G02B 5/00 | (2006.01) | |
| G02B 1/16 | (2015.01) | |
| G06F 3/041 | (2006.01) | |
| C09D 7/61 | (2018.01) | |

(52) U.S. Cl.
CPC .............. *G02B 5/008* (2013.01); *G02B 5/223* (2013.01); *G06F 1/16* (2013.01); *G06F 3/0412* (2013.01); *G06F 3/0445* (2019.05); *H01B 5/14* (2013.01); *G02B 2207/101* (2013.01); *G06F 3/045* (2013.01)

(58) Field of Classification Search
CPC ......... B82Y 15/00; B82Y 20/00; B82Y 25/00; B82Y 30/00; B82Y 35/00; B82Y 40/00; B82Y 99/00; C01P 2004/62; C01P 2004/64; C01P 2004/80; C01P 2006/22; C01P 2006/40; C01P 2006/60; C09C 1/3054; C09C 1/3081; C09C 1/309; G02F 1/355; Y10S 428/913; Y10S 977/777; Y10S 977/832; Y10S 977/834; Y10T 428/2991; Y10T 428/2993; Y10T 428/2998; H01B 1/22; H01B 1/24; H01B 1/02; H01B 13/0036; H05K 2201/026; H05K 1/0274; H05K 2201/0108; H05K 1/0296; H05K 1/09; H05K 1/097; H05K 1/095; H05K 9/0092; H05K 9/0094

See application file for complete search history.

(56) References Cited

U.S. PATENT DOCUMENTS

| | | | |
|---|---|---|---|
| 7,554,615 B2 | 6/2009 | Harada et al. | |
| 7,585,349 B2 | 9/2009 | Xia et al. | |
| 8,031,180 B2 | 10/2011 | Miyamoto et al. | |
| 8,049,333 B2 | 11/2011 | Alden et al. | |
| 8,748,749 B2 | 6/2014 | Srinivas et al. | |
| 9,150,746 B1 | 10/2015 | Li et al. | |
| 9,183,968 B1 | 11/2015 | Li et al. | |
| 2001/0002275 A1* | 5/2001 | Oldenburg | A61K 41/0042 427/214 |
| 2006/0192486 A1* | 8/2006 | Ogawa | 313/509 |
| 2008/0241262 A1 | 10/2008 | Lee et al. | |
| 2008/0259262 A1* | 10/2008 | Jones et al. | 349/139 |
| 2008/0295646 A1 | 12/2008 | Mirkin et al. | |
| 2010/0028554 A1* | 2/2010 | Ogawa et al. | 427/487 |
| 2010/0072434 A1 | 3/2010 | Lee et al. | |
| 2010/0243295 A1* | 9/2010 | Allemand | B82Y 10/00 174/250 |
| 2010/0261827 A1* | 10/2010 | Peri et al. | 524/440 |
| 2011/0039078 A1 | 2/2011 | Fournet et al. | |
| 2012/0073947 A1 | 3/2012 | Sakata et al. | |
| 2012/0101007 A1 | 4/2012 | Ahern et al. | |
| 2012/0132930 A1 | 5/2012 | Young et al. | |
| 2012/0183768 A1* | 7/2012 | Kondo et al. | 428/336 |
| 2013/0341074 A1* | 12/2013 | Virkar et al. | 174/255 |
| 2013/0342221 A1 | 12/2013 | Virkar et al. | |
| 2014/0005295 A1 | 1/2014 | Agrawal et al. | |
| 2014/0105982 A1 | 4/2014 | Oldenburg et al. | |
| 2014/0120168 A1* | 5/2014 | Oldenburg et al. | 424/497 |
| 2014/0162067 A1 | 6/2014 | Shajamali et al. | |
| 2014/0238833 A1 | 8/2014 | Virkar et al. | |
| 2015/0072066 A1 | 3/2015 | Karandikar et al. | |
| 2015/0144380 A1 | 5/2015 | Yang et al. | |
| 2016/0096967 A1 | 4/2016 | Virkar et al. | |
| 2016/0122562 A1 | 5/2016 | Yang et al. | |
| 2016/0369104 A1 | 12/2016 | Gu et al. | |

OTHER PUBLICATIONS

National Institute of Standards and Technology (NIST), Basic Atomic Spectroscopic Data (Silver), Dec. 1995 (according to ref. E95), p. 1.*
Cavalcante et al., "Colour Performance of Ceramic Nano-pigments," Dyes and Pigments, (2009), 80, 226-232.
Jiang et al., "Ultrasonic-Assisted Synthesis of Monodisperse Single-Crystalline Silver Nanoplates and Gold Nanorings," Inorg. Chem., (2004), 43(19), 5877-5885.
Kah et al., "Synthesis of gold nanoshells based on the deposition precipitation process," Gold Bulletin (2008), 41/1, 23-36.
Kelly et al., "Triangular Silver Nanoparticles: Their Preparation, Functionalisation and Properties," Acta Physica Polonica A, (2012), 122(2), 337-345.
Mock et al., "Shape effects in plasmon resonance of individual colloidal silver nanoparticles," J. Chem Phys., (2002), 116(15), 6755-6759.
Xiong et al.,"Poly(vinyl pyrrolidone): a dual functional reductant and stabilizer for the facile synthesis of noble metal nanoplates in aqueous solutions," Langmuir, (2006), 22, 8563-8570.
Yu et al., "Thermal Synthesis of Silver Nanoplates Revisited: A Modified Photochemical Process," ACS Nano, (2014), 8(10):10252-10261.
Zeng et al., "A Mechanistic Study on the Formation of Silver Nanoplates in the Presence of Silver Seeds and Citric Acid or Citrate Ions," Chem. Asian J., (2011), 6, 376-379.
Zhang et al., "A Systematic Study of the Synthesis of Silver Nanoplates: Is Citrate a 'Magic' Reagent?" J. Am. Chem. Soc., (2011), 133, 18931-18939.
Zhang et al., "Citrate-Free Synthesis of Silver Nanoplates and the Mechanistic Study," ACS Appl. Mater. Interfaces, (2013), 5, 6333-6345.
Brongersma, "Nanoscale photonics: Nanoshells: gifts in a gold wrapper," Nat. Mater., May 2003, 2(5):296-297.
Chen et al., "Contollable colours and shapes of silver nanostructures based on pH: application to surface-enhanced Raman scattering," Nanotechnology, (Jul. 2007), 18(32):325602.
Gao et al., "Highly Stable Silver Nanoplates for Surface Plasmon Resonance Biosensing," Angew. Chem., Int. Ed., (2012), 51,5629-5633.
Georgia Institute of Technology © 2013, "Synthesis and Stability of Silver Nanoplates," National Nanotechnology Infrastructure Network.
Liu et al., "One-step growth of triangular silver nanoplates with predictable sizes on a large scale," Nanoscale, (2014), 6, 4513-4516.
Oldenburg et al., "Nanoengineering of optical resonances," Chemical Physics Letters, 1998, 228:243-247.
Rangappa et al., "Transparent CoAl2O4 hybrid nano pigment by organic ligand-assisted supercritical water," J. Am. Chem. Soc., (2007), 129(36):11061-11066.
Si et al., "Synthesis of PSS-capped triangular silver nanoplates with tunable SPR," Colloids and Surfaces A: Physicochem. Eng. Aspects, (2011), 380, 257-260.
Sun et al., "Gold and Silver Nanoparticles: A class of chromophores with colors tunable in the range from 400 to 750 nm," Analyst, (2003), 128, 686-691.
Tharion et al., "Glucose mediated synthesis of gold nanoshells: A facile and eco-friendly approach conferring high colloidal stability," RSC Adv., (2014), 4, 3984-3991.
Co-pending application for U.S. Appl. No. 14/448,504, filed Jul. 31, 2014 (51 pages).
International Search Report and Written Opinion for co-pending application PCT/US2015/55768 dated Sep. 2, 2016 (9 pages).
Aherne et al., "Etching-Resistant Silver Nanoprisms by Epitaxial Deposition of a Protecting Layer of Gold at the Edges" Langmuir. (2009); 25 (17), pp. 10165-10173; DOI: 10.1021/la9009493 p. 10167, col. 1, para 3-4; col. 2, para 1; Figure 1, top.
Tsuji et al., "Rapid Transformation from Spherical Nanoparticles, Nanorods, Cubes, or Bipyramids to Triangular Prisms of Silver with

(56) References Cited

OTHER PUBLICATIONS

PVP, Citrate, and H2O2" Langmuir (2012) 28 (24), pp. 8845-8861 (DOI: 10.1021/la3001027) pp. 8846, col. 2, para 5; p. 8851, col. 1, para 1-2.

Chinese Office Action from corresponding Chinese Patent Application No. 201580062938.9 dated Dec. 5, 2018.

* cited by examiner

TRANSPARENT FILMS WITH CONTROL OF LIGHT HUE USING NANOSCALE COLORANTS

CROSS REFERENCE TO RELATED APPLICATIONS

This application claims priority to copending U.S. provisional patent application Ser. No. 62/065,314 to Yang et al., entitled "Transparent Conductive Films with Control of Light Hue," incorporated herein by reference.

FIELD OF THE INVENTION

The invention relates to nanoscale colorants incorporated into transparent films to influence the hue of the films. The invention further relates to transparent conductive films with nanoscale colorants to improve whiteness or to introduce desired coloration. The invention further relates to processing to form the transparent films with nanoscale colorants and to coating formulations for forming transparent layers with nanoscale colorants.

BACKGROUND OF THE INVENTION

Transparent polymer films are used in a wide range of products, such as electronic displays. Functional transparent films can provide desired functionality, such as transparent electrically conductive films. For example, electrically conductive films can be important for the dissipation of static electricity when static can be undesirable or dangerous. Optical films can be used to provide various functions, such as polarization, anti-reflection, phase shifting, brightness enhancement or other functions. High quality displays can comprise one or more optical coatings.

Transparent conductors can be used for several optoelectronic applications including, for example, touch-screens, liquid crystal displays (LCD), flat panel displays, organic light emitting diode (OLED), solar cells and smart windows. Historically, indium tin oxide (ITO) has been the material of choice due to its relatively high transparency at reasonable electrical conductivities. There are however several shortcomings with ITO. For example, ITO is a brittle ceramic which generally is deposited using sputtering, a fabrication process that involves high temperatures and vacuum and therefore can be relatively slow. Additionally, ITO is known to crack easily on flexible substrates.

SUMMARY OF THE INVENTION

In a first aspect, the invention pertains to a transparent conductive film comprising a substrate, a transparent conductive layer supported by the substrate, a coating and a nanoscale pigment. In some embodiments, a value of b* for the film can be reduced at least about 0.1 units and total transmittance of visible light in percent is not decreased by more than about 2 relative to the corresponding film without the nanoscale pigment.

In a further aspect, the invention pertains to a transparent conductive film comprising a substrate, a transparent conductive layer supported by the substrate, and a coating comprising nanoscale metal elements and a polymer binder.

In another aspect, the invention pertains to a transparent conductive film comprising a substrate and a transparent conductive layer comprising a sparse metal conductive element, in which the transparent conductive layer comprises nanostructured metal features having an absorption at 580 nm at least about 2 times the absorption at 475 nm.

In additional aspects, the invention pertains to a coating solution comprising from about 0.02 wt % to about 80 wt % non-volatile polymer binder precursor compounds, from about 0.001 wt % to about 2.5 wt % nanoscale metal elements and solvent.

DETAILED DESCRIPTION OF THE INVENTION

Figure 1:
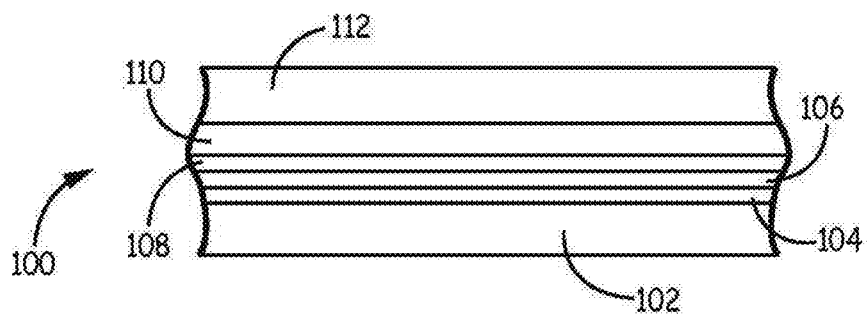
FIG. 1 is a fragmentary side view of a film with a sparse metal conductive layer and various additional transparent layers on either side of the sparse metal conductive layer.

It has been found that nanoscale colorants can be used to control the hue of light transmissions through a transparent conductive film without significantly altering the total light transmission, haze or the electrical conductivity of the film. In particular, metal nanoplates have been engineered to produce particular colors based on surface plasmon resonances and are commercially available. Other metal nanostructures with various shapes including, for example, nanoprisms, nanoshells, nanocubes, nanoribbons, nanocylinders/discs, nano-"bar-bells" or other nanoshapes, or pigments, such as inorganic nanoparticles or organic pigments can be used also. The nanoscale fillers functioning as colorants can be incorporated with a polymer binder into the electrically conductive layers and/or into a coating layer. The nanoscale colorants can compensate at least partially for colors in the transmission through the transparent conductive film due to the electrically conductive elements and/or can introduce a desired hue to the film. In particular, the transparent conductive films can be formed effectively from metal nanowires and/or from fused metal nanostructured networks, although in additional or alternative embodiments other transparent conductive materials such as appropriate metal oxides can be used. In some embodiments, the nanoscale colorants can improve the whiteness of light transmission through a nanowire-based conductive layer without significantly increasing haze or decreasing light transmission.

Color spaces can be defined to relate spectral wavelengths to human perception of color. CIELAB is a color space determined by the International Commission on Illumination (CIE). The CIELAB color space uses a three-dimensional set of coordinates, $L^*$, $a^*$ and $b^*$, where $L^*$ relates to the lightness of the color, $a^*$ relates to the position of the color between red and green, and $b^*$ relates to the position of the color between yellow and blue. The "*" values represent normalized values relative to a standard white point. As described below, these CIELAB parameters can be determined using commercial software from measurements made in a spectrophotometer.

Transparent conductive films can be formed from various nanomaterials, such as carbon nanotubes, metal nanowires and the like. Also, conductive metal oxides can be used to form conductive films, such as indium tin oxide (ITO), aluminum-doped zinc oxide (AZO) and the like. Conductive metal oxides can be formed as conductive layers or possibly as particulates in a layer with a polymer binder. With respect to silver nanowires for transparent conductive films, generally the use of longer and thinner nanowires results in better electrical conductivity for a given optical transparency. However, it has been observed that some films formed with thinner silver nanowires can appear yellowish.

It has been discovered that the color of the transparent conductive films can be made less yellow, i.e., smaller absolute value of $b^*$, through the incorporation of metal nanoplates, metal nanoshells, nanoribbons, or other nanoscale colorants, e.g., pigments. Nanoplates can be tuned for specific color properties based on surface plasmon resonances, and other nanoscale colorants can be selected based on their color and low contributions to decreases in total transmission. Metal nanostructures can be coated with polymer, different metals and/or nonmetal compositions, such as silica. Small amounts of the nanoscale colorants can be incorporated into the films to modify the overall color properties without in some embodiments significantly lowering the total transmission and/or increasing the haze. It has been discovered that certain size ranges and types of nanoplates and nanoshells can even lower the haze. In particular, the silver nanoplates, nanoshells or other nanoscale elements can compensate for color distortion introduced by electrically conductive elements in the film to produce whiter transmitted light. In other embodiments, correspondingly a desired color hue can be introduced to the transmitted light using selected nanoscale elements, if desired. The discussion herein focuses on producing whiter light, but it will be understood by a person of ordinary skill in the art that the introduction of a desired hue of transmitted light can be introduced through the introduction of selected nanoscale colorants while forming a transparent film generally with a total transmittance of visible light of at least about 85% in some embodiments. In appropriate embodiments, the nanoscale particulates can be effectively incorporated into an electrically conductive layer, a coating layer or both, and results for all three variations are presented in the Examples.

As described herein, color adjusted coatings can be formed with a modest drop in total transmission of visible light. Various polymers can be introduced as binders with relatively good mechanical strength to provide a good high transparency matrix. Generally, the coatings can be formed with small thicknesses while providing desired color adjustment. In some embodiments, small thicknesses can be desirable for use adjacent transparent conductive layers since electrical conductivity can be maintained through the thin overcoats. Thus, with coatings having average thicknesses of no more than about 100 microns and in some embodiments no more than a micron desirable levels of color adjustment can be obtained.

Good coating properties generally involve the formation of a good dispersion of the nanoscale colorants within a solution of the matrix polymer so that the resulting coating has reduced effects of clumps of particulates. The nanoscale colorants generally can be incorporated into a relatively smooth thin coating and so that the particles do not alter the optical properties more than desired. In general, the coatings have a nanoscale colorant loading of no more than about 30 weight percent. The concentrations of polymer binder and nanoscale colorant in a coating solution can be adjusted to yield desirable coating properties for the solution, such as viscosity, and thickness of the final coating. The ratio of concentration of solids in the coating solution can be adjusted to yield the coating concentrations desired once the coating is dried. The polymer component of the coating generally can be crosslinked with UV radiation or other means appropriate for the polymer binder to further strengthen the coating.

In general, the nanoscale colorants can be introduced into a passive protective coating and/or directly into a transparent conductive layer. Passive transparent protective coatings may or may not be used to cover a transparent conductive layer. A common feature for these coatings is the compatibility of the components in a coating solution as well as in the resulting composite material. Compatibility refers to the ability to effectively disperse into a relatively uniform material without an unacceptable degree of aggregation of the components, such as with clumping. In particular, the compatibility can allow for good distribution of the materials within the coating solutions to provide for formation of a reasonably uniform composite material forming the coating. A more uniform composite material is believed to contribute to desirable optical properties of the coating, such as good transparency and low haze.

For the passive coatings, the coating solutions can comprise a solvent, dissolved matrix polymer, nanoscale colorants, possible combinations thereof and optional additional components. A range of matrix polymers can be used that are suitable for transparent films, as described below. Wetting agents, such as surfactants, can be used as well as other processing aids. In general, the solvents can comprise water, organic solvents or suitable mixtures thereof. For the active coatings, the coating solutions generally further comprise components that contribute to the active functionality, such as metal nanowires for contributing electrical conductivity. Examples of both types of coatings are described below in the Examples.

Nanoscale colorants can be nanoscale metal structures or nanoscale pigments. Nanoscale metal structures generally have at least one average dimension that is no more than about 100 nm. For example, nanoplates have an average thickness of no more than 100 nm, nanoribbons can have a thickness of no more than about 100 nm and possibly a width of no more than 100 nm. Metal nanoplates can be synthesized using solution based techniques and their optical properties have been examined. See, for example, published U.S. patent applications 2012/0101007 to Ahern et al., entitled "Silver Nanoplates," and 2014/0105982 to Oldenburg et al., entitled "Silver Nanoplate Compositions and Methods," both of which are incorporated herein by reference. Silver nanoplates with tuned absorption properties based on surface plasmon resonances are available commercially from nanoComposix, Inc., San Diego, Calif., USA, Beijing Nanomeet Technology Co. Ltd., China, and Suzhou ColdStones Technology Co., Ltd., China. Examples are presented below for silver nanoplates tuned for 550 nm and/or 650 nm peak light absorption and/or scattering. Similarly, nanoplates can be synthesize directly, such as using known synthesis techniques, as for example, Kelly, J. M., et al., ACTA PHYSICA POLONICA A, (2012), 122, 337-345, "Triangular Silver Nanoparticles: Their Preparation, Functionalisation and Properties"; Jiang, Li-Ping, et al., Inorg. Chem., (2004), 43, 5877-5885, "Ultrasonic-Assisted Synthesis of Monodisperse Single-Crystalline Silver Nanoplates and Gold Nanorings"; and Xiong, Y., et al., Langmuir 2006 (20): 8563-8570, "Poly(vinyl pyrrolidone): a dual functional reductant and stabilizer for the facile synthesis of noble metal nanoplates in aqueous solutions," all three of which are incorporated herein by reference. As reported by nanoComposix, the nanoplates have thicknesses of about 10 nm and respectively (equivalent circular) diameters of 40-60 nm (550 nm nanoplates) or 60-80 nm (650 nm nanoplates). Some commercial nanoplates can be obtained with either a polyvinylpyrrolidone (PVP) coating or with a silica (silicon oxide) coating. In general, silver nanoplates with either coating are observed to yield desirable results, although the results with silica coated 550 nm absorbing nanoplates seem to provide a desirable decrease in the magnitude of b* with a desirably small increase in the magnitude of a*. Examples are presented below for films incorporating the 550 nm nanoplates, the 650 nm nanoplates or a combination thereof.

Metal nanoshells can be formed over silica or similar ceramic nanoparticle cores. Commercial gold nanoshells over silica are commercially available from nanoComposix, Sigma-Aldrich, and Nanospectra Biosciences, Inc. Houston, Tex., USA. The gold nanoshell forms a plasmon tunable material to introduce desired spectral properties. These materials can provide hue adjustment with modest decrease in light transmission and little increase in haze and possibly a decrease in haze. Solid gold nanoparticles are available commercially, for example, from NanoHybrids, Austin, Tex., Nanopartz Inc., Loveland, Colo. PlasmaChem GmbH, Germany. Silver nanoribbons, which can be referred to as nanobelts, are also commercially available, from nanoComposix. In general, specially shaped metal nanostructures may be formed according to a variety of different methods, for example, gold nanoshells may be prepared according to published procedures, for example, Hah et al., Gold Bulletin (2008), 41/1, 23-36, "Synthesis of gold nanoshells based on the deposition precipitation process".

A wide range of additional metal nanostructures are available for use as colorants, as summarized further below, although additional nanoscale materials tested as colorants in transparent films to date generally induce a greater increase in haze relative to the nanoplates or nanoshells, and haze may or may not be an issue for various applications.

A wide range of pigments are known and used for a wide range of commercial applications, and development of new pigments continues. Pigments are characterized by the significant insolubility in at least some reasonable solvent so that the pigments can be dispersed as particulates. The pigments can be inorganic, organic or organometallic. Some pigments can be processed to form nanoscale particulates or are commercially available with appropriate particle sizes. In some embodiments, nanopigments are crystalline compounds, which bestow color analogously to conventional pigments, but directly synthesized at the nanoscale (e.g., 10-50 nm). Examples of Nanopigments have been described in Cavalcante et al., Dyes and Pigments, (2009), 80, 226-232, entitled "Colour Performance of Ceramic Nano-pigments", and Gardini et al., Journal of Nanoscience and Nanotechnology, (2008), 8, 1979-1988, entitled "Nano-sized ceramic inks for drop-on-demand ink-jet printing in quadrichromy", both incorporated herein by reference.

Transparent electrically conductive films have been formed with silver nanowires or fused metal nanostructured networks, having a low surface resistance, with good optical transparency and with low haze. These films though can be observed in some embodiments to have a slight yellow tint, which corresponds in the CIELAB scale of a positive value of b*. It has been discovered that the inclusion of a small amount of nanoscale colorant can improve the hue to more of a neutral gray color, with the reduction of b*. A parameter L* provides the range from black to white along a neutral gray scale. A nanoscale colorant though can result in a slight decrease in transparency and a slight increase in the absolute value of a*, but these detrimental effects can generally be small and within acceptable levels.

With respect to the use of a nanoscale colorant to improve the whiteness of transmitted light through a transparent conductive film, the pigment is selected to have a small compensating absorption and/or scattering complementary to the absorption/scattering of the conductive material. Based on the CIELAB parameters, in principle, the films can be engineered to get a desired degree of whiteness, generally based on a small absolute value of b* and a* in the CIELAB scale. However, in view of practical limitations, design of the films can direct the results to produce whiter light within certain desired ranges (absolute values of b* and a* lower than target cutoff values), as has been achieved with nanoscale colorants exemplified herein. As explained further below, reasonable values of whiteness can be obtained with acceptable decreases in total transmission of visible light.

Similarly, the nanoscale colorant can be selected to introduce a desired hue or color rather than white light. For appropriate embodiments, the intrinsic contribution to the color based on an electrically conductive layer of a transparent conductive film can be factored into the selection of the pigment and loading of the pigment to achieve a desired color, which can be expressed by the b* and a* values in the CIELAB system. The selected hues can be patterned appropriately for a particular application, such as a display or the like.

In general, the metal nanoplates, nanoshells or other nanoscale colorants can be incorporated into a curable polymer matrix coating material and/or directly into a sparse metal conductive film, which can comprise a polymer binder, such as the curable polymers summarized below, along with metal nanowires and an optional fusing agent. Metal nanoscale elements in the conductive layer may or may not fuse with and be incorporated into a fused metal nanostructured network. However, in either case, the absorption properties of, for example, metal nanoplates can still be effectively used in the conductive layer to alter the hue of the film. A coating solution can be solution coated, dried, and in some embodiments, cured, for example with UV light, heat curing, other radiation curing or other appropriate crosslinking approach. The thickness of the coating can be selected for the particular application.

Coating/binder polymers suitable for solution coating are commercially available or can be formulated for use. Polymers can be selected for dissolving in aqueous or non-aqueous solvents. Suitable classes of radiation curable polymers and/or heat curable polymers are described further below. The polymer binders can be self-crosslinking upon exposure to radiation, and/or they can be crosslinked with a photoinitiator or other crosslinking agent.

For processing, the nanoscale colorants can be dispersed in a coating solution, for example, to form the coating or to form the transparent conductive layer. In some embodiments, a dispersion of nanoplates or other nanoscale colorant can be first dispersed and then added to a solution of the other components, such as a polymer binder, metal nanowires, other additives or the like. The concentration of nanoscale colorants can be selected to yield a desired loading in the eventual resulting layer formed from the coating solution. Based on concentrations of the coating solution, the wet coating thickness can be selected to yield a desired dry coating thickness based on the empirical decrease in coating thickness upon drying and further processing.

For the formation of transparent electrically conductive layers, various sparse metal conductive layers can be formed from metal nanowires. Metal nanowires can be formed from a range of metals, and metal nanowires are available commercially or can be synthesized. While metal nanowires are inherently electrically conducting, the vast majority of resistance in the metal nanowires based films is believed to due to the junctions between nanowires. Depending on processing conditions and nanowire properties, the sheet resistance of a relatively transparent nanowire film, as deposited, can be very large, such as in the giga-ohms/sq range or even higher. Various approaches have been proposed to reduce the electrical resistance of the nanowire films without destroying the optical transparency.

Films formed with metal nanowires that are processed to flatten the nanowires at junctions to improve conductivity is described in U.S. Pat. No. 8,049,333 to Alden et al., entitled "Transparent Conductors Comprising Metal Nanowires," incorporated herein by reference. Structures comprising surface embedded metal nanowires to increase metal conductivity are described in U.S. Pat. No. 8,748,749 to Srinivas et al., entitled "Patterned Transparent Conductors and Related Manufacturing Methods," incorporated herein by reference. However, desirable properties have been found for fused metal nanostructured networks with respect to high electrical conductivity and desirable optical properties with respect to transparency and low haze. Fusing of adjacent metal nanowires can be performed based on chemical processes at low temperatures under commercially appropriate processing conditions.

In particular, a significant advance with respect to achieving electrically conductive films based on metal nanowires has been the discovery of well controllable processes to form a fused metal network where adjacent sections of the metal nanowires fuse. Fusing of metal nanowires with various fusing sources is described further in published U.S. patent applications 2013/0341074 to Virkar et al., entitled "Metal Nanowire Networks and Transparent Conductive Material," and 2013/0342221 to Virkar et al. (the '221 application), entitled "Metal Nanostructured Networks and Transparent Conductive Material," 2014/0238833 to Virkar et al. (the '833 application), entitled "Fused Metal Nanostructured Networks, Fusing Solutions with Reducing Agents and Methods for Forming Metal Networks," and copending U.S. patent application Ser. No. 14/087,669 to Yang et al. (the '669 application), entitled "Transparent Conductive Coatings Based on Metal Nanowires, Solution Processing Thereof, and Patterning Approaches," copending U.S. patent application Ser. No. 14/448,504 to Li et al, entitled "Metal Nanowire Inks for the Formation of Transparent Conductive Films with Fused Networks," all of which are incorporated herein by reference.

The transparent conductive films generally can comprise several components or layers that contribute to the processability and/or the mechanical properties of the structure without detrimentally altering the optical properties. The sparse metal conductive layers can be designed to have desirable optical properties when incorporated into the transparent conductive films. The sparse metal conductive layer may or may not further comprise a polymer binder. Unless otherwise indicated, references to thicknesses refer to average thicknesses over the referenced layer or film, and adjacent layers may intertwine at their boundaries depending on the particular materials. In some embodiments, the total film structure can have a total transmission of visible light of at least about 85%, a haze of no more than about 2 percent and a sheet resistance of no more than about 250 ohms/sq, although significantly better performance is described herein.

With respect to nanoscale colorants, e.g., silver nanoplates and/or gold nanospheres, it has been found that the colorants can be added to a transparent coating composition and/or into the sparse metal conductive layer at levels effective to significantly decrease yellowness without sacrificing significantly the other optical properties of the coating. For incorporation into transparent coatings for transparent conductive films or directly into the ink for the formation of a sparse metal conductive layer, suitable quantities of nanoscale colorants in an overcoat and/or in the transparent electrically conductive layer generally do not increase the sheet resistance significantly. In some embodiments the sheet resistance increases in films with nanoscale colorants relative to the sheet resistance of corresponding unloaded films by no more than about 20%, and similarly the total transmission of visible light in percent can decrease by no more than about 5 in a film with nanoscale colorants relative to an unloaded film. Haze may or may not change significantly due to the presence of nanoscale colorants, and suitable nanoscale colorants may decease haze somewhat. A referenced unloaded film is produced with the coating solution that has the same concentrations of other components in the solvent and is processed the same way so that the final thickness may be slightly different.

Transparent, electrically conductive films find important applications, for example in solar cells and touch screens. Transparent conductive films formed from metal nanowire components offer the promise of lower processing cost and more adaptable physical properties relative to traditional materials. In a multilayered film with various structural polymer layer(s), the resulting film structure has been found to be robust with respect to processing while maintaining desirable electrical conductivity, and the incorporation of desirable components as described herein can additionally provide stabilization without degrading the functional properties of the film so that devices incorporating the films can have suitable lifetimes in normal use.

Transparent Coatings and Films

Transparent coatings with nanoscale colorant loaded polymers as described herein generally can be coated onto a transparent substrate for incorporation into a desired structure. General structures are described, and specific applications for transparent conductive films are found in following sections. In general, a precursor solution for the transparent filled coatings can be deposited using appropriate coating methods onto a transparent substrate to form a transparent structure. In some embodiments, the transparent substrate can be a film for incorporation into an ultimate device or alternatively or additionally an integral optical component, such as a light emitting device or a light receiving device. The discussion in this section focuses on a simple passive transparent substrate, and other structures are discussed in subsequent sections.

In general, any reasonable transparent substrate can be suitable. Thus, suitable substrates can be formed, for example, from inorganic glasses, such as silicate glasses, transparent polymer films, inorganic crystals or the like. In some embodiments, the substrate is a polymer film. Suitable polymers for a substrate include, for example, polyethylene terephthalate (PET), polyethylene naphthalate (PEN), polyacrylate, poly(methyl methacrylate), polyolefin, polyvinyl chloride, fluoropolymers, polyamide, polyimide, polysulfone, polysiloxane, polyetheretherketone, polynorbonene, polyester, polystyrene, polyurethane, polyvinyl alcohol, polyvinyl acetate, acrylonitrile-butadiene-styrene copolymer, cyclic olefin polymer, cyclic olefin copolymer, polycarbonate, copolymers thereof or blend thereof or the like. Polymer films for some embodiments can have a thickness from about 5 microns to about 5 mm, in further embodiments, from about 10 microns to about 2 mm and in additional embodiment from about 15 microns to about 1 mm. A person of ordinary skill in the art will recognize that additional ranges of thicknesses within the explicit ranges above are contemplated and are within the present disclosure. Substrates can comprise a plurality of layers distinguished by composition and/or other properties. Some commercial transparent sheets can comprise a coating such as a hard abrasive resistant coating.

A transparent coating, e.g., with nanoscale colorant filler, generally can have a thickness of no more than about 100 microns, in further embodiments from about 15 nanometers (nm) to about 50 microns and in additional embodiments from about 50 nm to about 20 microns. Coating properties over a transparent conductive layer are described below. The transparent hue adjusted coatings can comprise from about 0.001 weight percent (wt %) to about 10 wt % nanoscale colorants, in further embodiments from about 0.005 wt % to about 6 wt %, in other embodiments from about 0.01 wt % to about 5 wt %, and in additional embodiments from about 0.02 wt % to about 2.5 wt % nanoscale colorants. The transparent coatings can further comprise polymer binder, optional property modifiers, such as crosslinking agents, wetting agents, viscosity modifiers, and/or stabilizers for transparent conductive films, and optionally a sparse metal conductive layer. A person of ordinary skill in the art will recognize that additional ranges of thickness and nanoparticle concentrations in the loaded polymers within the explicit ranges above are contemplated and are within the present disclosure.

With respect to nanoscale colorants, the nanoscale nature of the particulate colorants can provide for good distribution throughout a polymer matrix such that a desirable degree of transparency can be maintained for a given color contribution. For some embodiments, various metal nanostructures can provide desirable color properties. In particular, metal nanoplates and metal nanoshells have been found to provide desirable color contributions with little or no haze contribution and a low level of transparency reduction. However, other metal nanostructures, such as metal nanoribbons, nanoprisms, nanocubes, nanocages/nanoboxes, nanocylinders/discs, nano-"bar-bells", nanorods, flower-like nanostructures, nanoparticles or other nanoshapes such as nanotetrahedrons and nanododecahedrons, as well as pigment nanoparticles can also be effectively used as colorants in transparent films. In the context of color tuning of metal nanostructures, see for example, Sun et al., "Gold and silver nanoparticles: A class of chromophores with colors tunable in the range from 400 to 750 nm," *Analyst* (2003), 128, 686-691, incorporated herein by reference. Synthesis conditions can be adjusted to select particular shapes of metal nanoscale element as described in U.S. Pat. No. 7,585,349 to Xia et al., entitled "Method of Nanostructure Formation and Shape Selection," incorporated herein by reference. Metal nanostructure colorants can comprise any reasonable metal, alloys thereof or combinations thereof, such as silver, gold, indium, tin, iron, cobalt, platinum, palladium, nickel, cobalt, titanium, copper and alloys thereof. Nanoscale pigments can be insoluble inorganic compositions, organic compositions or organometallic compositions. For the lowering of the b* scale of a silver based sparse metal conductive element, silver nanoplates and gold nanoshells have been found particularly effective and such elements are commercially available. A wide range of pigments are known and widely used commercially. Representative pigments can be processed or are available in nanoscale formats. Generally, nanoscale refers to the average of at least one dimension of the particulates (dimensional cut-off) being no more than about 100 nm, in further embodiments no more than about 75 nm and in additional embodiments no more than about 50 nm. Thus, suitable nanoscale particulates can include, for example, nanoplates with one dimension, the average thickness, being no more than the dimensional cut-off, nanoribbons, which have one or possibly two dimensions, average thickness and/or average width, being no more than the dimensional cut-off, nanoparticles with three dimensions, e.g., the average diameters along the particle principle axes, being no more than the dimensional cut-off and various other possible structures with two dimensions being no more than the dimensional cut-off. Metal nanoplates, metal nanoshells and other metal nanostructures can provide tuned color contributions based on size through hypothesized surface plasmon resonances, although Applicant does not wish to be limited by theory. Nanoscale metal elements can have various coatings, and commercial versions may have coating choices. As noted in the Examples, silver nanoplates can be obtained commercially with a polyvinylpyrrolidone coating or a silicon oxide (silica) coating. As an example below is presented with gold coated silver nanoparticles in which the gold coating is applied with a published procedure. Due to the inertness of gold, the gold coated silver nanoplates can be stable with respect to corrosion and other environmental assaults.

The transparent loaded coatings can be formed by coating a precursor solution using appropriate coating methods. Nanoscale colorants can be incorporated into a suitable solvent selected to deposit the coating with appropriate compatibility. Suitable solvents generally include, for example, water, alcohols, ketones, esters, ethers, such as glycol ethers, aromatic compounds, alkanes, and the like and mixtures thereof. Specific solvents include, for example, water, ethanol, isopropyl alcohol, isobutyl alcohol, tertiary butyl alcohol, methyl ethyl ketone, glycol ethers, methyl isobutyl ketone, toluene, hexane, ethyl acetate, butyl acetate, ethyl lactate, PGMEA (2-methoxy-1-methylethylacetate), N,N-dimethyl formamide, N,N-dimethyl acetamide, acetonitrile, formic acid, dimethyl carbonate, or mixtures thereof.

In general, the polymer for the coating, generally a crosslinkable polymer, can be supplied as a commercial coating composition or formulated with selected polymer compositions, for addition of nanoscale colorants and/or other additives. Following usual convention, in the context of binders, the term polymer refers to oligomers, which can be derivatized to introduce additional functionalities. Crosslinking agents as well as other binder precursor components can be multifunctional, e.g., three or more functional groups, for forming highly crosslinked polymer products upon appropriate crosslinking conditions, which may be considered functionalized monomers or functionalized oligomers depending on the specific structure. Suitable polymers for the coatings can include, for example, radiation curable polymers and/or heat curable polymers. Suitable classes of radiation curable polymers and/or heat curable polymers include, for example, polysiloxanes, polysilsesquioxanes, polyurethanes, acrylic resins, acrylic copolymers, cellulose ethers and esters, nitrocellulose, other structural polysaccharides, polyethers, polyesters, polystyrene, polyimide, fluoropolymers, styrene-acrylate copolymers, styrene-butadiene copolymers, acrylonitrile butadiene styrene copolymers, polysulfides, epoxy containing polymers, copolymers thereof, and mixtures thereof. Suitable commercial coating compositions include, for example, coating solutions from Dexerials Corporation (Japan), POSS® Coatings from Hybrid Plastics, Inc. (Mississippi, USA), silica filled siloxane coatings from California Hardcoating Company (CA, USA), CrystalCoat UV-curable coatings from SDC Technologies, Inc. (CA, USA). In some embodiments, the crosslinkable binder precursor composition can comprise non-volatile relatively high molecular monomers in formulations with or without oligomers or lower molecular weight polymers in addition to the monomers. Collectively, non-volatile polymerizable compounds, which can be monomers, oligomers or lower molecular weight polymers, can be referred to as non-volatile polymer binder precursor compounds.

The polymer concentrations and correspondingly the concentrations of other non-volatile agents can be selected to achieve desired rheology of the coating solution, such as an appropriate viscosity for the selected coating process. Solvent can be added or removed to adjust total non-volatile concentrations, which distinguish the volatile solvents. Relative amounts of non-volatile can be selected to adjust the composition of the finished coating composition, and the total amounts of solids can be adjusted to achieve a desired thickness of the dried coating. Generally, the coating solution can have a concentration of non-volatile components from about 0.1 wt % to about 80 wt %, in further embodiments from about 0.5 wt % to about 60 wt % and in additional embodiments from about 0.75 wt % to about 55 wt %. A person of ordinary skill in the art will recognize that additional ranges of polymer concentrations within the specific ranges above are contemplated and are within the present disclosure.

Nanoscale colorants can be incorporated into the coating solution for forming a coating layer. A coating precursor solution can comprise from about 0.0001 wt % to about 2 wt % nanoscale colorants, in further embodiments from about 0.00025 wt % to about 0.2 wt % and in additional embodiments from about 0.0005 wt % to about 0.02 wt % nanoscale colorants. A person of ordinary skill in the art will recognize that additional ranges of stabilization compound in a coating solution within the explicit ranges above are contemplated and are within the present disclosure. Additional additives, such as crosslinking agents, wetting agents, viscosity modifiers, dispersing aids, stabilizers, and the like can be added as desired, and suitable compositions are described below.

The transparent coating with nanoscale colorants in some embodiments can cause a decrease of the total transmittance of visible light relative to a corresponding coating without the nanoscale colorants by no more than about 5 percentage points, in further embodiments no more than about 3 and in additional embodiments no more than about 1.5 percentage points. Also, the transparent coating with nanoscale colorants can cause an increase of the haze in some embodiments relative to corresponding unloaded coatings by no more than about 1.5 percentage points, in further embodiments by no more than about 1, and in additional embodiments by no more than about 0.6 percentage points. A person of ordinary skill in the art will recognize that additional ranges of modifications of optical properties due to loaded polymer coatings within the explicit ranges above are contemplated and are within the present disclosure. The corresponding unloaded coatings have the same concentrations in the solvent of components other than the absent nanoparticles and is processed the same way so that the final thickness of the coating may be slightly different for the corresponding coating.

For the deposition of the coating precursor solutions, any reasonable deposition approach can be used, such as dip coating, spray coating, knife edge coating, bar coating, Meyer-rod coating, slot-die coating, gravure printing, inkjet printing, screen printing, spin coating or the like. The deposition approach directs the amount of liquid deposited, and the concentration of the solution can be adjusted to provide the desired thickness of product coating on the surface. After forming the coating with the dispersion, the coating can be dried to remove the liquid and crosslinked appropriately.

Transparent Conductive Films

The transparent electrically conductive structures or films generally can comprise a sparse metal conductive layer that provides the electrical conductivity without significantly adversely altering the optical properties and various additional layers that provide mechanical support as well as protection of the conductive element. A polymer overcoat can be placed over the sparse metal conductive layer. The nanoscale colorants as described herein can be placed in an overcoat layer, an undercoat layer and/or directly into the sparse metal conductive layer. In additional embodiments, an electrically conductive layer can comprise conductive metal oxides as a film or as particulates. The nanoscale colorants can be selected to lower the b* value of the transparent film, which generally improves the whiteness observed, or to provide a desired hue to the film.

Transparent electrically conductive elements, e.g., films, can comprise a sparse metal conductive layer in some embodiments. The conductive layers are generally sparse to provide desired amount of optical transparency, so the coverage of the metal has very significant gaps within the layer of the conductive element. For example, transparent electrically conductive films can comprise metal nanowires deposited along a layer where sufficient contact can be provided for electron percolation to provide suitable conduction pathways. In other embodiments, the transparent electrically conductive film can comprise a fused metal nanostructured network, which has been found to exhibit desirable electrical and optical properties. In general, the nanowires can be formed from a range of metals, such as silver, gold, indium, tin, iron, cobalt, platinum, palladium, nickel, cobalt, titanium, copper and alloys thereof, which can be desirable due to high electrical conductivity. Commercial metal nanowires are available from Sigma-Aldrich (Missouri, USA), Cangzhou Nano-Channel Material Co., Ltd. (China), Blue Nano (North Carolina, U.S.A.), EMFUTUR (Spain), Seashell Technologies (California, U.S.A.), Aiden (Korea), nanoComposix (U.S.A.), Nanopyxis (Korea), K&B (Korea), ACS Materials (China), KeChuang Advanced Materials (China), and Nanotrons (USA). Alternatively, silver nanowires can also be synthesized using a variety of known synthesis routes or variations thereof.

For appropriate embodiments, a sparse metal conductive layer can be formed on a substrate that can have one or more layers in the structure of the substrate. The substrate generally can be identified as a self supporting film or sheet structure. A thin solution processed layer, referred to as an undercoat, can be optionally placed along the top surface of the substrate film and immediately under the sparse metal conductive layer. Also, the sparse metal conductive can be coated with one or more additional layers that provide some protection on the side of the sparse metal conductive layer opposite the substrate. In general, the electrically conductive structure can be placed in either orientation in the final product, i.e., with the substrate facing outward or with the substrate against the surface of the product supporting the electrically conductive structure. In some embodiments, a plurality of coatings, e.g., undercoats and/or overcoats, can be applied, and each layer may or may not have selected nanoscale colorants.

Referring to FIG. 1, representative transparent conductive film 100 comprises a substrate 102, undercoat layer 104, sparse metal conductive layer 106, overcoat layer 108, optically clear adhesive layer 110 and protective surface layer 112, although not all embodiments include all layers. A transparent conductive film generally comprises a sparse metal conductive layer and at least one layer on each side of the sparse metal conductive layer. The total thickness of the transparent conductive film can generally have a thickness from 10 microns to about 3 millimeters (mm), in further embodiments from about 15 microns to about 2.5 mm and in other embodiments from about 25 microns to about 1.5 mm. A person of ordinary skill in the art will recognize that additional ranges of thicknesses within the explicit ranges above are contemplated and are within the present disclosure. In some embodiments, the length and width of the film as produced can be selected to be appropriate for a specific application so that the film can be directly introduced for further processing into a product. In additional or alternative embodiments, a width of the film can be selected for a specific application, while the length of the film can be long with the expectation that the film can be cut to a desired length for use. For example, the film can be in long sheets or a roll. Similarly, in some embodiments, the film can be on a roll or in another large standard format and elements of the film can be cut according to a desired length and width for use.

Substrate 102 generally comprises a durable support layer formed from an appropriate polymer or polymers. In some embodiments, the substrate can has a thickness from about 10 microns to about 1.5 mm, in further embodiments from about 15 microns to about 1.25 mm and in additional embodiments from about 25 microns to about 1 mm. A person of ordinary skill in the art will recognize that additional ranges of thicknesses of the substrate within the explicit ranges above are contemplated and are within the present disclosure. Suitable optically clear polymers with very good transparency, low haze and good protective abilities can be used for the substrate. Suitable polymers include, for example, polyethylene terephthalate (PET), polyethylene naphthalate (PEN), polyacrylate, poly(methyl methacrylate), polyolefin, polyvinyl chloride, fluoropolymers, polyamide, polyimide, polysulfone, polysiloxane, polyetheretherketone, polynorbonene, polyester, polystyrene, polyurethane, polyvinyl alcohol, polyvinyl acetate, acrylonitrile-butadiene-styrene copolymer, cyclic olefin polymer, cyclic olefin copolymer, polycarbonate, copolymers thereof or blend thereof or the like. Suitable commercial polycarbonate substrates include, for example, MAKROFOL SR243 1-1 CG, commercially available from Bayer Material Science; TAP® Plastic, commercially available from TAP Plastics; and LEXAN™ 8010CDE, commercially available from SABIC Innovative Plastics. Protective surface layer 112 can independently have a thickness and composition covering the same thickness ranges and composition ranges as the substrate as described in this paragraph above.

Optional undercoat 104 and/or optional overcoat 108, independently selectable for inclusion, can be placed respectively under or over sparse metal conductive layer 106. Optional coatings 104, 108 can comprise a curable polymer, e.g., heat curable or radiation curable polymers. Suitable polymers for coatings 104, 108 are described below as binders for inclusion in the metal nanowire inks, and the list of polymers, corresponding cross linking agents and additives apply equally to optional coatings 104, 108 without repeating the discussion explicitly here. Coatings 104, 108 can have a thickness from about 25 nm to about 2 microns, in further embodiments from about 40 nm to about 1.5 microns and in additional embodiments from about 50 nm to about 1 micron. A person of ordinary skill in the art will recognize that additional ranges of overcoat thickness within the explicit ranges above are contemplated and are within the present disclosure. In general, the thinness of overcoat 108 allows for electrical conduction through overcoat 108 so that electrical connection can be made to sparse metal conductive layer 106, although in some embodiments, an overcoat can comprise sublayers in which electrical conductivity is provided through some but not necessarily all of the sublayers.

Optional optically clear adhesive layer 110 can have a thickness from about 10 microns to about 300 microns, in further embodiments from about 15 microns to about 250 microns and in other embodiments from about 20 microns to about 200 microns. A person of ordinary skill in the art will recognize that additional ranges of thicknesses of optically clear adhesive layers within the explicit ranges above are contemplated and are within the present disclosure. Suitable optically clear adhesives can be contact adhesives. Optically clear adhesives include, for example, coatable compositions and adhesive tapes. UV curable liquid optically clear adhesives are available based on acrylic or polysiloxane chemistries. Suitable adhesive tapes are available commercially, for example, from Lintec Corporation (MO series); Saint Gobain Performance Plastics (DF713 series); Nitto Americas (Nitto Denko) (LUCIACS CS9621T and LUCIAS CS9622T); DIC Corporation (DAITAC LT series OCA, DAITAC WS series OCA and DAITAC ZB series); PANAC Plastic Film Company (PANACLEAN series); Minnesota Mining and Manufacturing (3M, Minnesota U.S.A.—product numbers 8146, 8171, 8172, 8173 and similar products) and Adhesive Research (for example product 8932).

The amount of nanowires delivered onto the substrate for sparse metal conductive layer 106 can involve a balance of factors to achieve desired amounts of transparency and electrical conductivity. While thickness of the nanowire network can in principle be evaluated using scanning electron microscopy, the network can be relatively sparse to provide for optical transparency, which can complicate the measurement. In general, the sparse metal conductive structure, e.g., fused metal nanowire network, would have an average thickness of no more than about 5 microns, in further embodiments no more than about 2 microns and in other embodiments from about 10 nm to about 500 nm. However, the sparse metal conductive structures are generally relatively open structures with significant surface texture on a submicron scale. The loading levels of the nanowires can provide a useful parameter of the network that can be readily evaluated, and the loading value provides an alternative parameter related to thickness. Thus, as used herein, loading levels of nanowires onto the substrate is generally presented as milligrams of nanowires for a square meter of substrate. In general, the metal conductive networks, whether or not fused, can have a loading from about 0.1 milligrams (mg)/$m^2$ to about 300 mg/$m^2$, in further embodiments from about 0.5 mg/$m^2$ to about 200 mg/$m^2$, and in other embodiments from about 1 mg/$m^2$ to about 150 mg/$m^2$. The transparent conductive layer can comprise from about 0.05 wt % to about 70 wt % metal, in other embodiments from about 0.075 wt % to about 60 wt % and in further embodiments from about 0.1 wt % to about 50 wt % metal in a conductive network. A person of ordinary skill in the art will recognize that additional ranges of thickness, metal loading and concentrations within the explicit ranges above are contemplated and are within the present disclosure. If the sparse metal conductive layer is patterned, the thickness and loading discussion applies only to the regions where metal is not excluded or significantly diminished by the patterning process. The sparse metal conductive layer can comprise nanoscale colorants in addition to a polymer binder and other processing aids and the like. Ranges of concentration of nanoscale colorants described above for loadings in transparent polymer layers generally also apply to sparse metal conductive layers. Expressed another way, the weight ratio of metal nanowires used to form a sparse metal conductive element to nanoscale colorants can be from about 250:1 to about 5:1 and in further embodiments from about 100:1 to about 10:1. It is possible that in relevant embodiments metal nanostructures incorporated into the sparse metal conductive layer may or may not fuse or partially fuse into the fused metal nanostructured network, although unless explicitly stated references to metal nanostructures in a layer with a fused metal nanostructured network refer generally to the structure whether or not the metal nanostructures fuse into the network. No significant changes in electrical conductivity or color expectations are observed with the introduction of metal nanoplates in the sparse metal conductive layer. Correspondingly, references to metal nanostructures as nanoscale colorants do not refer to metal nanowires incorporated into the fused metal nanostructured network.

Generally, within the total thicknesses above for particular components of film 100, layers 102, 104, 106, 108, 110, 112 can be subdivided into sublayers, for example, with different compositions from other sublayers. For example, an overcoat layer can comprise sublayers with different property enhancing components. Thus, more complex layer stacks can be formed. Sublayers may or may not be processed similarly to other sublayers within a particular layer, for example, one sublayer can be laminated while another sublayer can be coated and cured. For example, a coating can be supplied with a nanoscale colorant and a further layer over this layer can be supplied with a property enhancing nanoparticles, such as a nanodiamond to provide protective hardness. Polymer coatings with property enhancing nanoparticles, such as nanodiamonds, are described in copending U.S. patent application Ser. No. 14/577,669 to Virkar et al., entitled "Property Enhancing Fillers for Transparent Coatings and Transparent Conductive films," incorporated herein by reference.

For some applications, it is desirable to pattern the electrically conductive portions of the film to introduce desired functionality, such as distinct regions of a touch sensor. Patterning can be performed by changing the metal loading on the substrate surface either by printing metal nanowires at selected locations with other locations being effectively barren of metal or to etch or otherwise ablate metal from selected locations either before and/or after fusing the nanowires if the nanowires are fused in the particular embodiment. For appropriate embodiments, it has been discovered that high contrast in electrical conductivity can be achieved between fused and unfused portions of a layer with essentially equivalent metal loading so that patterning can be performed by selectively fusing the metal nanowires. This ability to pattern based on fusing provides significant additional patterning options based on selective fusing of the nanowires, for example, through the selective delivery of a fusing solution or vapor. Patterning based on selective fusing of metal nanowires is described in the '833 application and the '669 application above.

Figure 2:
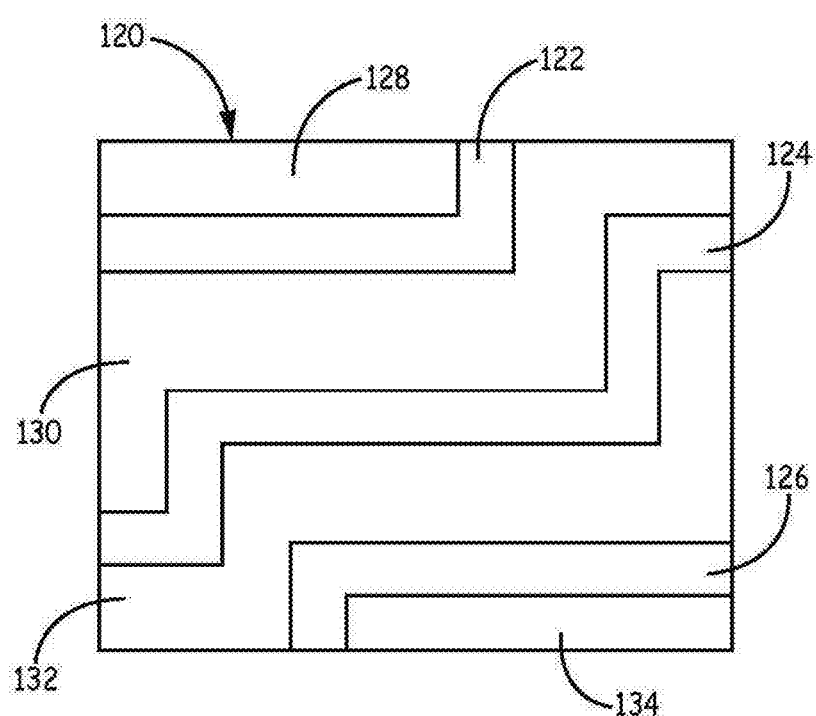
FIG. 2 is a top view of a representative schematic patterned structure with three electrically conductive pathways formed with sparse metal conductive layers.

As a schematic example, a fused metal nanostructured network can form conductive patterns along a substrate surface 120 with a plurality of electrically conductive pathways 122, 124, and 126 surrounded by electrically resistive regions 128, 130, 132, 134, as shown in FIG. 2. As shown in FIG. 2, the fused area correspond with three distinct electrically conductive regions corresponding with electrically conductive pathways 122, 124, and 126. Although three independently connected conductive regions have been illustrated in FIG. 2, it is understood that patterns with two, four or more than 4 conductive independent conductive pathways or regions can be formed as desired. For many commercial applications, fairly intricate patterns can be formed with a large number of elements. In particular, with available patterning technology adapted for the patterning of the films described herein, very fine patterns can be formed with highly resolved features. Similarly, the shapes of the particular conductive regions can be selected as desired.

The transparent conductive film is generally built up around the sparse metal conductive element which is deposited to form the functional feature of the film. Various layers are coated, laminated or otherwise added to the structure using appropriate film processing approaches. The deposit of the sparse metal conductive layer is described further below in the context of a fused metal nanostructured layers, but un-fused metal nanowire coatings can be similarly deposited except that the fusing components are absent.

The sparse metal conductive layer generally is solution coated onto a substrate, which may or may not have a coating layer on top of the substrate which then forms an undercoat adjacent the sparse metal conductive layer. An overcoat can be solution coated onto the sparse metal conductive layer in some embodiments. Crosslinking, with application of UV light, heat or other radiation, can be performed to crosslink polymer binders in the coating layers and/or the sparse metal conductive layer, which can be performed in one step or multiple steps.

Sparse Metal Conductive Layers

Sparse metal conductive layers are generally formed from metal nanowires. With sufficient loading and selected nanowire properties, reasonable electrical conductivity can be achieved with the nanowires with corresponding appropriate optical properties. It is expected that the stabilized film structures described herein can yield desirable performance for films with various sparse metal conductive structures. However, particularly desirable properties have been achieved with fused metal nanostructured networks.

As summarized above, several practical approaches have been developed to accomplish the metal nanowire fusing. The metal loading can be balanced to achieve desirable levels of electrical conductivity with good optical properties. In general, the metal nanowire processing can be accomplished through deposition of two inks with the first ink comprising the metal nanowires and the second ink comprising a fusing composition, or through the deposition of an ink that combines the fusing elements into the metal nanowire dispersion. The inks may or may not further comprise additional processing aids, binders or the like. Suitable patterning approaches can be selected to be suitable for the particular ink system.

In general, one or more solutions or inks for the formation of the metal nanostructured network can collectively comprise well dispersed metal nanowires, a fusing agent, and optional additional components, for example, a polymer binder, a crosslinking agent, a wetting agent, e.g., a surfactant, a thickener, a dispersant, other optional additives or combinations thereof. The solvent for the metal nanowire ink and/or the fusing solution if distinct from the nanowire ink can comprise an aqueous solvent, an organic solvent or mixtures thereof. In particular, suitable solvents include, for example, water, alcohols, ketones, esters, ethers, such as glycol ethers, aromatic compounds, alkanes, and the like and mixtures thereof. Specific solvents include, for example, water, ethanol, isopropyl alcohol, isobutyl alcohol, tertiary butyl alcohol, methyl ethyl ketone, glycol ethers, methyl isobutyl ketone, toluene, hexane, ethyl acetate, butyl acetate, ethyl lactate, PGMEA (2-methoxy-1-methylethylacetate), dimethyl carbonate, or mixtures thereof. While the solvent should be selected based on the ability to form a good dispersion of metal nanowires, the solvents should also be compatible with the other selected additives so that the additives are soluble in the solvent. For embodiments in which the fusing agent is included in a single solution with the metal nanowires, the solvent or a component thereof may or may not be a significant component of the fusing solution, such as alcohols and can be selected accordingly if desired.

The metal nanowire ink, in either a one ink or two ink configuration, can include from about 0.01 to about 1 weight percent metal nanowires, in further embodiments from 0.02 to about 0.75 weight percent metal nanowires and in additional embodiments from about 0.04 to about 0.5 weight percent metal nanowires. A person of ordinary skill in the art will recognize that additional ranges of metal nanowire concentrations within the explicit ranges above are contemplated and are within the present disclosure. The concentration of metal nanowires influences the loading of metal on the substrate surface as well as the physical properties of the ink.

In general, the nanowires can be formed from a range of metals, such as silver, gold, indium, tin, iron, cobalt, platinum, palladium, nickel, cobalt, titanium, copper and alloys thereof, which can be desirable due to high electrical conductivity. Commercial metal nanowires are available from Sigma-Aldrich (Missouri, USA), Cangzhou Nano-Channel Material Co., Ltd. (China), Blue Nano (North Carolina, U.S.A.), EMFUTUR (Spain), Seashell Technologies (California, U.S.A.), Alden (Korea), nanoComposix (U.S.A.), Nanopyxis (Korea), K&B (Korea), ACS Materials (China), KeChuang Advanced Materials (China), and Nanotrons (USA). Silver in particular provides excellent electrical conductivity, and commercial silver nanowires are available. Alternatively, silver nanowires can also be synthesized using a variety of known synthesis routes or variations thereof. To have good transparency and low haze, it is desirable for the nanowires to have a range of small diameters. In particular, it is desirable for the metal nanowires to have an average diameter of no more than about 250 nm, in further embodiments no more than about 150 nm, and in other embodiments from about 10 nm to about 120 nm. With respect to average length, nanowires with a longer length are expected to provide better electrical conductivity within a network. In general, the metal nanowires can have an average length of at least a micron, in further embodiments, at least 2.5 microns and in other embodiments from about 5 microns to about 100 microns, although improved synthesis techniques developed in the future may make longer nanowires possible. An aspect ratio can be specified as the ratio of the average length divided by the average diameter, and in some embodiments, the nanowires can have an aspect ratio of at least about 25, in further embodiments from about 50 to about 10,000 and in additional embodiments from about 100 to about 2000. A person of ordinary skill in the art will recognize that additional ranges of nanowire dimensions within the explicit ranges above are contemplated and are within the present disclosure.

Polymer binders and the solvents are generally selected consistently such that the polymer binder is soluble or dispersible in the solvent. In appropriate embodiments, the metal nanowire ink generally comprises from about 0.02 to about 5 weight percent binder, in further embodiments from about 0.05 to about 4 weight percent binder and in additional embodiments from about 0.1 to about 2.5 weight percent polymer binder. In some embodiments, the polymer binder comprises a crosslinkable organic polymer, such as a radiation crosslinkable organic polymer and/or a heat curable organic binder. To facilitate the crosslinking of the binder, the metal nanowire ink can comprise in some embodiments from about 0.0005 wt % to about 1 wt % of a crosslinking agent, in further embodiments from about 0.002 wt % to about 0.5 wt % and in additional embodiments from about 0.005 wt % to about 0.25 wt %. The nanowire ink can optionally comprise a rheology modifying agent or combinations thereof. In some embodiments, the ink can comprise a wetting agent or surfactant to lower the surface tension, and a wetting agent can be useful to improve coating properties. The wetting agent generally is soluble in the solvent. In some embodiments, the nanowire ink can comprise from about 0.01 weight percent to about 1 weight percent wetting agent, in further embodiments from about 0.02 to about 0.75 weight percent and in other embodiments from about 0.03 to about 0.6 weight percent wetting agent. A thickener can be used optionally as a rheology modifying agent to stabilize the dispersion and reduce or eliminate settling. In some embodiments, the nanowire ink can comprise optionally from about 0.05 to about 5 weight percent thickener, in further embodiments from about 0.075 to about 4 weight percent and in other embodiments from about 0.1 to about 3 weight percent thickener. A person of ordinary skill in the art will recognize that additional ranges of binder, wetting agent and thickening agent concentrations within the explicit ranges above are contemplated and are within the present disclosure.

A range of polymer binders can be suitable for dissolving/dispersing in a solvent for the metal nanowires, and suitable binders include polymers that have been developed for coating applications. Hard coat polymers, e.g., radiation curable coatings, are commercially available, for example as hard coat materials for a range of applications, that can be selected for dissolving in aqueous or non-aqueous solvents. Suitable classes of radiation curable polymers and/or heat curable polymers include, for example, polyurethanes, acrylic resins, acrylic copolymers, cellulose ethers and esters, other water insoluble structural polysaccharides, polyethers, polyesters, epoxy containing polymers, and mixtures thereof. Examples of commercial polymer binders include, for example, NEOCRYL® brand acrylic resin (DMS NeoResins), JONCRYL® brand acrylic copolymers (BASF Resins), ELVACITE® brand acrylic resin (Lucite International), SANCURE® brand urethanes (Lubrizol Advanced Materials), cellulose acetate butyrate polymers (CAB brands from Eastman™ Chemical), BAYHYDROL™ brand polyurethane dispersions (Bayer Material Science), UCECOAT® brand polyurethane dispersions (Cytec Industries, Inc.), MOWITOL® brand polyvinyl butyral (Kuraray America, Inc.), cellulose ethers, e.g., ethyl cellulose or hydroxypropyl methyl cellulose, other polysaccharide based polymers such as Chitosan and pectin, synthetic polymers like polyvinyl acetate, and the like. The polymer binders can be self-crosslinking upon exposure to radiation, and/or they can be crosslinked with a photoinitiator or other crosslinking agent. In some embodiments, photocrosslinkers may form radicals upon exposure to radiation, and the radicals then induce crosslinking reactions based on radical polymerization mechanisms. Suitable photoinitiators include, for example, commercially available products, such as IRGACURE® brand (BASF), GENOCURE™ brand (Rahn USA Corp.), and DOUBLECURE® brand (Double Bond Chemical Ind., Co, Ltd.), combinations thereof or the like.

Wetting agents can be used to improve the coatability of the metal nanowire inks as well as the quality of the metal nanowire dispersion. In particular, the wetting agents can lower the surface energy of the ink so that the ink spreads well onto a surface following coating. Wetting agents can be surfactants and/or dispersants. Surfactants are a class of materials that function to lower surface energy, and surfactants can improve solubility of materials. Surfactants generally have a hydrophilic portion of the molecule and a hydrophobic portion of the molecule that contributes to its properties. A wide range of surfactants, such as nonionic surfactants, cationic surfactant, anionic surfactants, zwitterionic surfactants, are commercially available. In some embodiments, if properties associated with surfactants are not an issue, non-surfactant wetting agents, e.g., dispersants, are also known in the art and can be effective to improve the wetting ability of the inks. Suitable commercial wetting agents include, for example, COATOSIL™ brand epoxy functionalized silane oligomers (Momentum Performance Materials), SILWET™ brand organosilicone surfactant (Momentum Performance Materials), THETAWET™ brand short chain non-ionic fluorosurfactants (ICT Industries, Inc.), ZETASPERSE® brand polymeric dispersants (Air Products Inc.), SOLSPERSE® brand polymeric dispersants (Lubrizol), XOANONS WE-D545 surfactant (Anhui Xoanons Chemical Co., Ltd), EFKA™ PU 4009 polymeric dispersant (BASF), MASURF FP-815 CP, MASURF FS-910 (Mason Chemicals), NOVEC™ FC-4430 fluorinated surfactant (3M), mixtures thereof, and the like.

Thickeners can be used to improve the stability of the dispersion by reducing or eliminating settling of the solids from the metal nanowire inks. Thickeners may or may not significantly change the viscosity or other fluid properties of the ink. Suitable thickeners are commercially available and include, for example, CRAYVALLAC™ brand of modified urea such as LA-100 (Cray Valley Acrylics, USA), polyacrylamide, THIXOL™ 53 L brand acrylic thickener, COAPUR™ 2025, COAPUR™ 830 W, COAPUR™ 6050, COAPUR™ XS71 (Coatex, Inc.), BYK® brand of modified urea (BYK Additives), Acrysol DR 73, Acrysol RM-995, Acrysol RM-8W (Dow Coating Materials), Aquaflow NHS-300, Aquaflow XLS-530 hydrophobically modified polyether thickeners (Ashland Inc.), Borchi Gel L 75 N, Borchi Gel PW25 (OMG Borchers), and the like.

As noted above, the inks for depositing the sparse metal conductive layers can further comprise nanoscale colorants. Suitable nanoscale colorants include, for example, metal nanostructure colorants as well as other nanoscale pigments presented above which are specifically incorporated into the present discussion. Also, the ranges of nanoscale colorant sizes are summarized above in the context of coatings and are similarly incorporated here. The solution to form the sparse metal conductive layer can comprise from about 0.0001 wt % to about 2.5 wt % nanoscale colorants, in further embodiments from about 0.0002 wt % to about 2 wt % and in additional embodiments from about 0.0005 to about 1.5 wt % nanoscale colorants. A person of ordinary skill in the art will recognize that additional ranges of nanoparticle concentrations within the explicit ranges above are contemplated and are within the present disclosure.

Additional additives can be added to the metal nanowire ink, generally each in an amount of no more than about 5 weight percent, in further embodiments no more than about 2 weight percent and in further embodiments no more than about 1 weight percent. Other additives can include, for example, anti-oxidants, UV stabilizers, defoamers or anti-foaming agents, anti-settling agents, viscosity modifying agents, or the like.

As noted above, fusing of the metal nanowires can be accomplished through various agents. Without wanting to be limited by theory, the fusing agents are believed to mobilize metal ions, and the free energy seems to be lowered in the fusing process. Excessive metal migration or growth may lead in some embodiments to a degeneration of the optical properties, so desirable results can be achieved through a shift in equilibrium in a reasonably controlled way, generally for a short period of time, to generate sufficient fusing to obtain desired electrical conductivity while maintaining desired optical properties. In some embodiments, initiation of the fusing process can be controlled through a partial drying of the solutions to increase concentrations of the components, and quenching of the fusing process can be accomplished, for example, through rinsing or more completing drying of the metal layer. The fusing agent can be incorporated into a single ink along with the metal nanowires. The one ink solution can provide appropriate control of the fusing process.

In some embodiments, a process is used in which a sparse nanowire film is initially deposited and subsequent processing with or without depositing another ink provides for the fusing of the metal nanowires into a metal nanostructured network, which is electrically conducting. The fusing process can be performed with controlled exposure to a fusing vapor and/or through the deposition of a fusing agent in solution. Sparse metal conductive layers are generally formed on a selected substrate surface. The as-deposited nanowire film generally is dried to remove the solvent. Processing can be adapted for patterning of the film.

For the deposition of the metal nanowire ink, any reasonable deposition approach can be used, such as dip coating, spray coating, knife edge coating, bar coating, Meyer-rod coating, slot-die coating, gravure printing, spin coating or the like. The ink can have properties, such as viscosity, adjusted appropriately with additives for the desired deposition approach. Similarly, the deposition approach directs the amount of liquid deposited, and the concentration of the ink can be adjusted to provide the desired loading of metal nanowires on the surface. After forming the coating with the dispersion, the sparse metal conductive layer can be dried to remove the liquid.

The films can be dried, for example, with a heat gun, an oven, a thermal lamp or the like, although the films that can be air dried can be desired in some embodiments. In some embodiments, the films can be heated to temperatures from about 50° C. to about 150° C. during drying. After drying, the films can be washed one or more times, for example, with an alcohol or other solvent or solvent blend, such as ethanol or isopropyl alcohol, to remove excess solids to lower haze. Patterning can be achieved in several convenient ways. For example, printing of the metal nanowires can directly result in patterning. Additionally or alternatively, lithographic techniques and/or ablation methods can be used to remove portions of the metal nanowires, prior to or after fusing, to form a pattern. One or more overcoat layers can be applied over the sparse metal conductive layer, as described above.

Optically clear adhesive layers and thicker protective films covering the sparse metal conductive layer can be formed with holes or the like in appropriate locations to provide for electrical connections to the conductive layer. In general, various polymer film processing techniques and equipment can be used to the processing of these polymer sheets, and such equipment and techniques are well developed in the art, and future developed processing techniques and equipment can be correspondingly adapted for the materials herein.

Properties of Hue Adjusted Films

The nanoscale colorants are generally selected to provide desired color adjustment of the transparent film without reducing the total transparency more than an acceptable amount. An acceptable amount of transparency reduction may be application specific. In some embodiments, it is further desirable for films with the nanoscale colorants to have a continued low haze. In particular, nanoplates and nanoshells have been found to provide good color adjustment with low contributions to haze. In general, the transparent films further comprise a transparent conductive layer, such as a sparse metal conductive layer.

In the context of sparse metal conductive layers, the colorants may be selected to lower the overall value of b* in the CIE color scale. Highly conductive sparse metal conductive layers can be found to have a yellowish tint, and the lowering of b* can result in a whiter appearance of the film. As demonstrated in the Examples, several specific nanoscale colorants have been found to successfully lower the b* value of the films. Additionally or alternatively, a selected color or color pattern can be introduced through the incorporation of selected nanoscale colorants. For example, a pattern of colored panels can be introduced.

In some embodiments, the nanoscale colorant can result in a decrease in b* of at least about 0.2, in further embodiments at least about 0.25, and in additional embodiments at least about 0.3 relative to corresponding films without the nanoscale colorant. Also, it can be desirable for the absolute value of b* for the transparent film to be no more than 1.2, in further embodiments no more than 1.1 and in additional embodiments no more than a value of 1.0. For embodiments with desired more white transmission, the absolute value of a* in the films with the nanoscale colorants can be no more than about 1, in additional embodiment no more than about 0.65, in other embodiments no more than about 0.6, and in further embodiments no more than about 0.5. A person of ordinary skill in the art will recognize that additional ranges of optical parameters within the explicit ranges above are contemplated and are within the present disclosure. Values of b* and a* can be evaluated using the equations in the standard CIE DE2000, Center International Commission on Illumination (Commission Internationale de L'Eclairage), see Colorimetry, 3rd Edition, CIE, 2004, incorporated herein by reference. These calculations can be performed using commercial spectrophotometers and software, such as Konica Minolta Spectrophotometer CM-3700A with SpectraMagic™ NX software.

The general electrical and optical properties of the transparent conductive films are presented in the following section, and the ranges of effect of the nanoscale colorants on these properties is discussed in the following. For incorporation into transparent coatings for transparent conductive films or directly into the ink for the formation of a sparse metal conductive layer, the loaded overcoats generally do not increase the sheet resistance of the sparse metal conductive layer with the thin overcoat significantly relative to an equivalent film without the nanoscale colorant, and in some embodiments the sheet resistance increases by no more than about 20%, in further embodiments, no more than about 15% and in additional embodiments, no more than about 10% relative to the sheet resistance of a corresponding film without the nanoscale colorants. While achieving the desired decrease of b*, the nanoscale colorants can decrease total transmission relative to incident visible light in units of percent transmission in some embodiments by less than about 3 and in further embodiments by less than about 2, and in some embodiments by no more than about 1.5 relative to corresponding films without the nanoscale colorant. Also, it can be desirable for the haze to not increase a large amount with the nanoscale colorant in the film. In some embodiments, the haze can increase in measured values of haze in units of percent by no more than about 0.5, in further embodiments by no more than about 0.4, in additional embodiments no more than about 0.3, in other embodiments by no more than about 0.25, in some embodiments by no more than about 0.2 and in additional embodiments no more than about 0.15 relative to a corresponding film without the nanoscale colorant. In some embodiments with silver nanoplates and silver nanoshells, the haze is actually observed to decrease, so some nanoscale colorants at an appropriate concentration can be used to reduce haze in addition to improving the whiteness of transmitted light, although nanoscale pigments tested to date significantly increase the haze. A person of ordinary skill in the art will recognize that additional ranges of sheet resistance increase, total transmittance change and haze change within the explicit ranges above are contemplated and are within the present disclosure.

In some embodiments, the haze value can increase relative to the haze value of a corresponding unloaded film in units of haze generally reported as a percent.

Transparent Conductive Films—Electrical and Optical Properties

The sparse metal conductive layers, e.g., fused metal nanostructured networks, can provide low electrical resistance while providing good optical properties. Thus, the films can be useful as transparent conductive electrodes or the like. The transparent conductive electrodes can be suitable for a range of applications such as electrodes along light receiving surfaces of solar cells. For displays and in particular for touch screens, the films can be patterned to provide electrically conductive patterns formed by the film. The substrate with the patterned film, generally has good optical properties at the respective portions of the pattern.

Electrical resistance of thin films can be expressed as a sheet resistance, which is reported in units of ohms per square ($\Omega/\square$ or ohms/sq) to distinguish the values from bulk electrical resistance values according to parameters related to the measurement process. Sheet resistance of films is generally measured using a four point probe measurement or another suitable process. In some embodiments, the fused metal nanowire networks can have a sheet resistance of no more than about 300 ohms/sq, in further embodiments no more than about 200 ohms/sq, in additional embodiments no more than about 100 ohms/sq and in other embodiments no more than about 60 ohms/sq. A person of ordinary skill in the art will recognize that additional ranges of sheet resistance within the explicit ranges above are contemplated and are within the present disclosure. Depending on the particular application, commercial specifications for sheet resistances for use in a device may not be necessarily directed to lower values of sheet resistance such as when additional cost may be involved, and current commercially relevant values may be for example, 270 ohms/sq, versus 150 ohms/sq, versus 100 ohms/sq, versus 50 ohms/sq, versus 40 ohms/sq, versus 30 ohms/sq or less as target values for different quality and/or size touch screens, and each of these values defines a range between the specific values as end points of the range, such as 270 ohms/sq to 150 ohms/sq, 270 ohms/sq to 100 ohms/sq, 150 ohms/sq to 100 ohms/sq and the like with 15 particular ranges being defined. Thus, lower cost films may be suitable for certain applications in exchange for modestly higher sheet resistance values. In general, sheet resistance can be reduced by increasing the loading of nanowires, but an increased loading may not be desirable from other perspectives, and metal loading is only one factor among many for achieving low values of sheet resistance.

For applications as transparent conductive films, it is desirable for the fused metal nanowire networks or other sparse metal conductive layer to maintain good optical transparency. In principle, optical transparency is inversely related to the loading with higher loadings leading to a reduction in transparency, although processing of the network can also significantly affect the transparency. Also, polymer binders and other additives can be selected to maintain good optical transparency. The optical transparency can be evaluated relative to the transmitted light through the substrate. For example, the transparency of the conductive film described herein can be measured by using a UV-Visible spectrophotometer and measuring the total transmission through the conductive film and support substrate. Transmittance is the ratio of the transmitted light intensity (I) to the incident light intensity ($I_o$). The transmittance through the film ($T_{film}$) can be estimated by dividing the total transmittance (T) measured by the transmittance through the support substrate ($T_{sub}$). ($T=I/I_o$ and $T/T_{sub}=(I/I_o)/(I_{sub}/I_o)=I/I_{sub}=T_{film}$) Thus, the reported total transmissions can be corrected to remove the transmission through the substrate to obtain transmissions of a conductive layer, overcoat or other component alone. While it is generally desirable to have good optical transparency across the visible spectrum, for convenience, optical transmission can be reported at 550 nm wavelength of light. Alternatively or additionally, transmission can be reported as total transmittance from 400 nm to 700 nm wavelength of light, and such results are reported in the Examples below. In general, for the fused metal nanowire films, the measurements of 550 nm transmittance and total transmittance from 400 nm to 700 nm (or just "total transmittance" for convenience) are not qualitatively different. In some embodiments, the film formed by the fused network has a total transmittance (TT %) of at least 80%, in further embodiments at least about 85%, in additional embodiments, at least about 90%, in other embodiments at least about 94% and in some embodiments from about 95% to about 99%. Transparency of the films on a transparent polymer substrate can be evaluated using the standard ASTM D1003 ("Standard Test Method for Haze and Luminous Transmittance of Transparent Plastics"), incorporated herein by reference. A person or ordinary skill in the art will recognize that additional ranges of transmittance within the explicit ranges above are contemplated and are within the present disclosure. When adjusting the measured optical properties for the films in the Examples below for the substrate, the films have very good transmission and haze values, which are achieved along with the low sheet resistances observed.

The fused metal networks can also have low haze along with high transmission of visible light while having desirably low sheet resistance. Haze can be measured using a hazemeter based on ASTM D1003 referenced above, and the haze contribution of the substrate can be removed to provide haze values of the transparent conductive film. In some embodiments, the sintered network film can have a haze value of no more than about 1.2%, in further embodiments no more than about 1.1%, in additional embodiments no more than about 1.0% and in other embodiments from about 0.9% to about 0.2%. As described in the Examples, with appropriately selected silver nanowires very low values of haze and sheet resistance have been simultaneously achieved. The loading can be adjusted to balance the sheet resistance and the haze values with very low haze values possible with still good sheet resistance values. Specifically, haze values of no more than 0.8%, and in further embodiments from about 0.4% to about 0.7%, can be achieved with values of sheet resistance of at least about 45 ohms/sq. Also, haze values of 0.7% to about 1.2%, and in some embodiments from about 0.75% to about 1.05%, can be achieved with sheet resistance values of from about 30 ohms/sq to about 45 ohms/sq. All of these films maintained good optical transparency. A person of ordinary skill in the art will recognize that additional ranges of haze within the explicit ranges above are contemplated and are within the present disclosure.

With respect to the corresponding properties of the multilayered films, the additional components are generally selected to have a small effect on the optical properties, and various coatings and substrates are commercially available for use in transparent elements. Suitable optical coatings, substrates and associated materials are summarized above. Some of the structural material can be electrically insulating, and if thicker insulating layers are used, the film can be patterned to provide locations where gaps or voids through the insulating layers can provide access and electrical contact to the otherwise embedded electrically conductive element.

Touch Sensors

Figure 3:
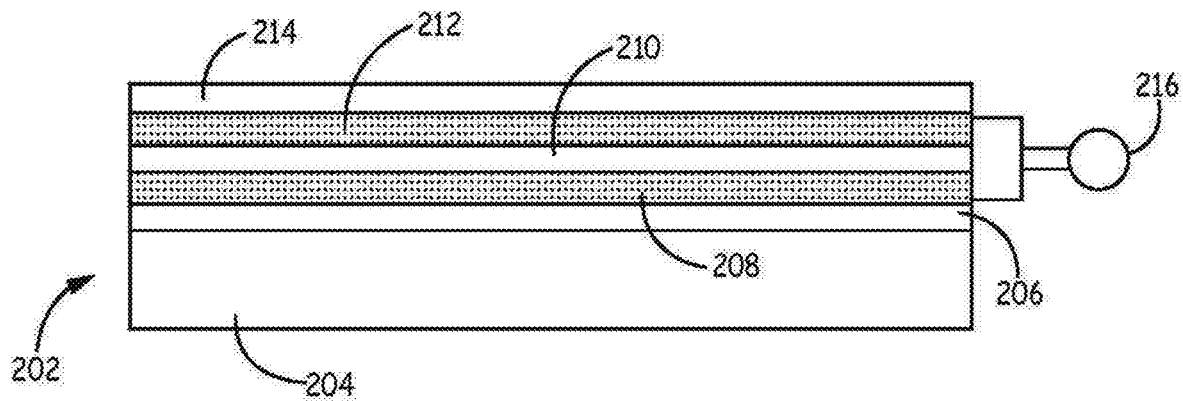
FIG. 3 is a schematic diagram showing a capacitance based touch sensor.
Figure 4:
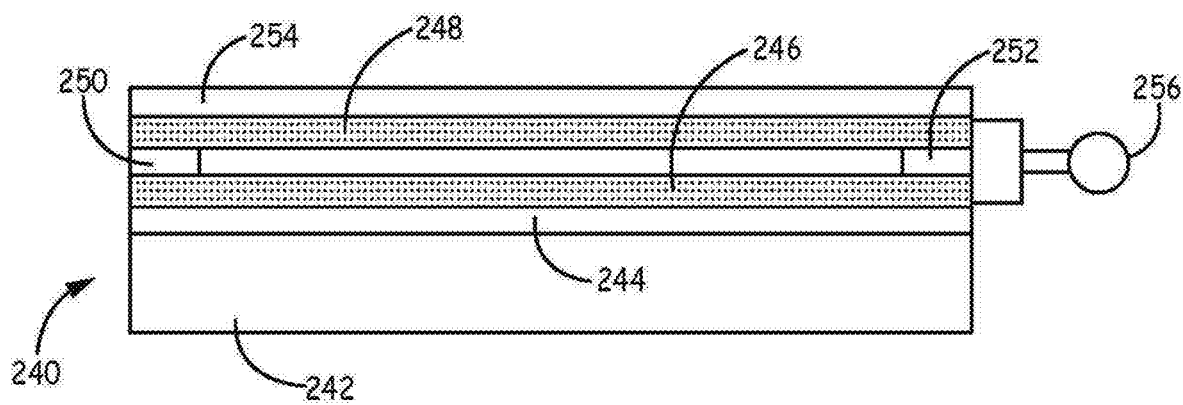
FIG. 4 is a schematic diagram showing a resistance based touch sensor.

The transparent conductive films described herein can be effectively incorporated into touch sensors that can be adapted for touch screens used for many electronic devices. Some representative embodiments are generally described here, but the transparent conductive films can be adapted for other desired designs. A common feature of the touch sensors generally is the presence of two transparent conductive electrode structures in a spaced apart configuration in a natural state, i.e., when not being touched or otherwise externally contacted. For sensors operating based on capacitance, a dielectric layer is generally between the two electrode structures. Referring to FIG. 3, a representative capacitance based touch sensor 202 comprises a display component 204, an optional bottom substrate 206, a first transparent conductive electrode structure 208, a dielectric layer 210, such as a polymer or glass sheet, a second transparent conductive electrode structure 212, optional top cover 214, and measurement circuit 216 that measures capacitance changes associated with touching of the sensor. Referring to FIG. 4, a representative resistance based touch sensor 240 comprises a display component 242, an optional lower substrate 244, a first transparent conductive electrode structure 246, a second transparent conductive electrode structure 248, support structures 250, 252 that support the spaced apart configuration of the electrode structures in their natural configuration, upper cover layer 254 and resistance measuring circuit 256.

Display components 204, 242 can be, for example, LED based displays, LCD displays or other desired display components. Substrates 206, 244 and cover layers 214, 254 can be independently transparent polymer sheets or other transparent sheets. Support structures can be formed from a dielectric material, and the sensor structures can comprise additional supports to provide a desired stable device. Measurement circuits 216, 256 are known in the art.

Transparent conductive electrodes 208, 212, 246 and 248 can be effectively formed using fused metal networks or other sparse metal conductive layer, which can be patterned appropriately to form distinct sensors, although in some embodiments a sparse metal conductive layer form some transparent electrode structures while other transparent electrode structures in the device can comprise materials such as indium tin oxide, aluminum doped zinc oxide or the like. It can be desirable for patterned films in one or more of the electrode structures to form the sensors such that the plurality of electrodes in a transparent conductive structure can be used to provide position information related to the touching process. The use of patterned transparent conductive electrodes for the formation of patterned touch sensors is described, for example, in U.S. Pat. No. 8,031,180 to Miyamoto et al., entitled "Touch Sensor, Display With Touch Sensor, and Method for Generating Position Data," and published U.S. patent application 2012/0073947 to Sakata et al., entitled "Narrow Frame Touch Input Sheet, Manufacturing Method of Same, and Conductive Sheet Used in Narrow Frame Touch Input Sheet," both of which are incorporated herein by reference.

EXAMPLES

The following examples involve the coating of nanoscale colorant loaded polymer precursor solutions onto appropriate substrates. Examples demonstrating the effects on hue of nanoscale colorants are presented with silver nanoplates, nanopigments, silver nanoribbons, gold shell/silica nanospheres, and gold-capped silver nanoplates. The examples involve nanoscale colorants associated with fused metal conductive networks that result in the formation in a transparent conductive film. Examples are presented with the nanoscale colorants in the conductive layer with the fused metal nanostructured network or in a coating placed over the layer with the fused metal nanostructured network. The fused metal nanostructured network was formed using silver nanowires from two different commercial sources. In general, the inclusion of some of the nanoscale colorants significantly decreased b* without degrading other properties unacceptably.

The testing described herein involve the formation of a fused metal nanostructured network on a PET polyester substrate as well as some testing on other materials such as an indium tin oxide (ITO) film. The fused metal nanostructured network was formed with a single ink comprising silver nanowires with a fusing composition. A polymer hard coating was applied over the fused metal nanostructured network or ITO film. In the overall structure, contributions to color parameter b* can arise from the various components of the film, so one set of experimental results are present with just the PET substrate alone and no transparent conductive layer to show the effects of just the substrate.

Commercial silver nanowires were used in the following examples with an average diameter of between 25 and 50 nm and an average length of 10-30 microns. The silver nanowire ink was essentially as described in Example 5 of copending U.S. patent application Ser. No. 14/448,504 to Li et al., entitled "Metal Nanowire Inks for the Formation of Transparent Conductive Films with Fused Networks," incorporated herein by reference. The metal nanowire ink comprised silver nanowires at a level between 0.1 to 1.0 wt %, between 0.05 mg/mL and 2.5 mg/mL silver ions, and a cellulose based binder at concentrations from about 0.01 to 1 wt %. The silver nanowire inks were aqueous solutions with a small amount of alcohol. The ink was slot coated onto a PET polyester film. After coating the nanowire inks, the films were then heated in an oven at 100° C. for 10 min to dry the films. The ITO film was formed from materials obtained from Sigma-Aldrich, which was designed for an approximate sheet resistance of 100 ohm/sq. Formation procedures for the overcoats are described below in the specific examples.

The total transmission (TT) and haze of the film samples were measured using a Haze Meter. To adjust the haze measurements for the samples below, a value of substrate haze can be subtracted from the measurements to get approximate haze measurements for the transparent conductive films alone. The instrument is designed to evaluate optical properties based on ASTM D 1003 standard ("Standard Test Method for Haze and Luminous Transmittance of Transparent Plastics"), incorporated herein by reference. The total transmission and haze of these films include PET substrate which has base total transmission and haze of ~92.9% and 0.1%-0.4%, respectively. In the following examples, two different formulations of fusing metal nanowire inks are presented along with optical and sheet resistance measurements. CIELAB values of b* and a* were determined using commercial software from measurements made with a Konica Minolta Spectrophotometer CM-3700A with SpectraMagic™ NX software.

Sheet resistance was measured with a 4-point probe method, a contactless resistance meter or by measuring the resistance of the film by using a square defined by two solid (non-transparent) lines of silver formed from silver paste. In some embodiments, to make sheet resistance measurements, a pair of parallel stripes of silver paste was sometime used by painting the paste onto the surface of the samples to define a square, or a rectangular shape, which were then annealed at roughly 120° C. for 20 minutes in order to cure and dry the silver paste. Alligator clips were connected to the silver paste stripes, and the leads were connected to a commercial resistance measurement device.

Example 1

The Effect of Silver Nanoplates in Commercial Overcoats Over a Transparent Substrate with a Conductive Layer This example tests the optical properties of transparent conductive films incorporating commercial overcoats incorporating silver nanoplates with two samples on a nonconductive substrate for comparison.

Figure 5:
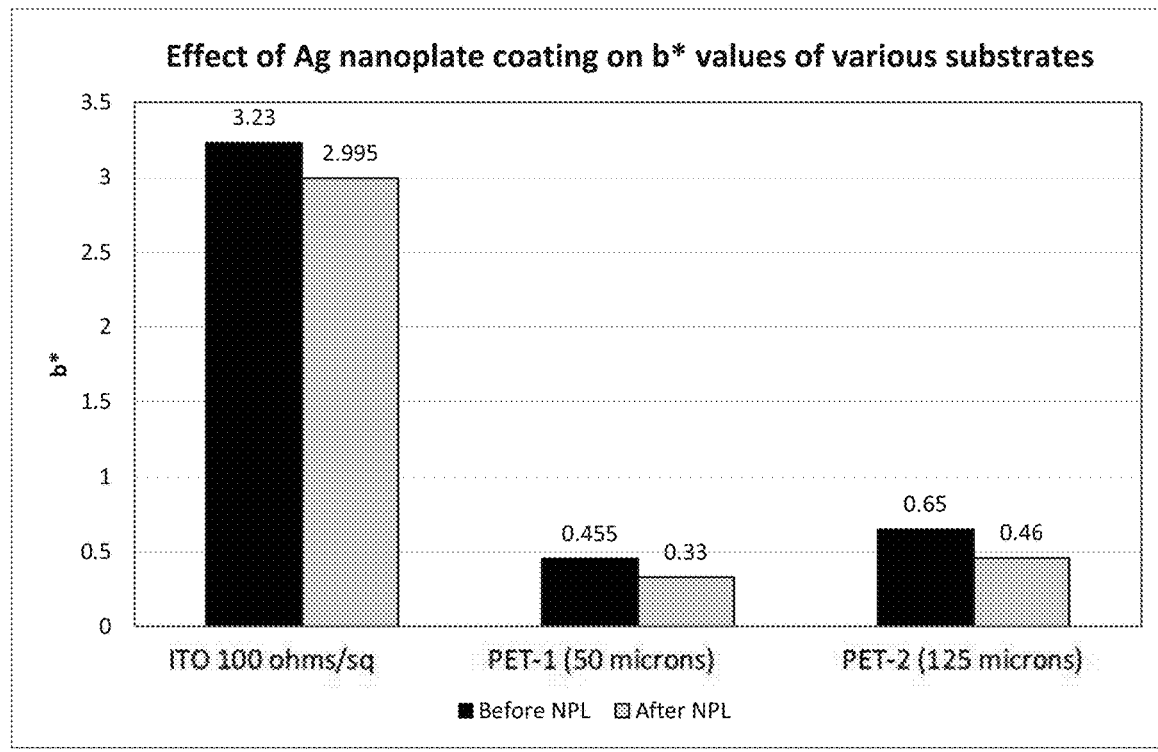
FIG. 5 is a histogram showing changes in the value of b* for overcoats on three different substrates with or without silver nanoplates.

A first set of three samples were prepared by forming an overcoat with silver nanoplates without forming a sparse metal conductive layer. The overcoat was formed with a solution of a commercial hard coat polymer and commercial silver nanoplates having an optical absorption maximum near 550 nm. The silver nanoplates had a polyvinylpyrrolidone (PVP) coating. The coating solution was slot coated to a wet thickness of 1 mil (about 25 microns). The coating was dried and crosslinked with UV light. The substrates included two commercial double hard-coated PET, one is 50-micron and the other 125-micron thick transparent films, and one transparent film coated with indium tin oxide (ITO) designed to yield approximately 100 ohms/sq. The results are presented in Table 1 and FIG. 5. The nanoplates were effective to moderately reduced b*, although b* for the ITO coated substrates was high.

TABLE 1

| Substrate | Nanoplate (NPL) (wt %) | b* wo/NPL | b* w/NPL |
|---|---|---|---|
| ITO Coated | 0.004% | 3.230 | 2.995 |
| PET-1 (50-micron) | 0.004% | 0.455 | 0.330 |
| PET-2 (125-micron) | 0.004% | 0.650 | 0.460 |

Additional results were obtained with coatings onto substrates with a fused metal nanostructured network. The substrate was prepared by coating a silver nanowire ink onto a transparent substrate and dried. Following drying, the layer comprised fused metal nanostructured network with sheet resistances for the conductive layers between 50 and 60 ohms/sq. An overcoat was applied with a commercial hard coat polymer and silver nanoplates. The coating was dried and crosslinked with UV light. The thin overcoat layers with the silver nanoplates did not significantly change the sheet resistance of the film after applying and curing the overcoat. Two different metal nanowire ink systems were tested with silver nanowires obtained from two different suppliers. The transparent conductive films formed with nanowires from Supplier 2 (AgNW-2) initially had lower values of b* without any compensating nanoscale colorants. Coating were formed with one of two different sizes of nanoplates or their combination. The substrates with the fused metal nanostructured network had an initial haze prior to application of the overcoat of 1.12% with the first nanowire ink system with silver nanowires form a first supplier and 1.28% with the second nanowire ink system with nanowires supplied by a second supplier. The coating solutions were deposited onto the substrate by slot coating at either 1 mil or 2 mil wet thickness. The optical properties were compared between the films formed with a coating having nanoplates and films formed with a coating without nanoplates.

Figure 6:
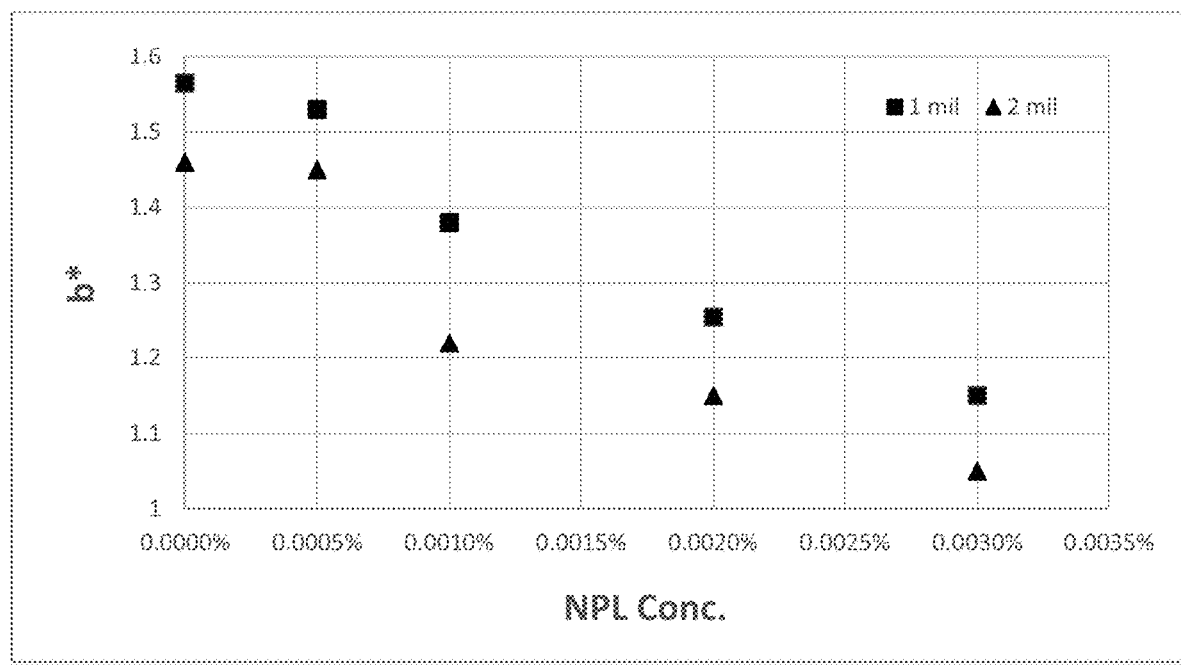
FIG. 6 is a plot of b* as a function of concentration of silver nanoplates in polymer overcoats over conductive fused metal nanostructures networks for two different wet coating thicknesses.

A first set of samples were prepared with the first silver nanowire ink system (Supplier 1, AgNW-1). A commercial coating polymer from Dexerials was dissolved in propylene glycol monoethyl ether (PGME) solution at a polymer concentration of 0.5 wt %. Twelve solutions in various polymer concentrations and one of two wet thicknesses (1 mil (25.4 microns) or 2 mil) were formed with seven of the solutions having PVP coated silver nanoplates with an absorption peaked near 650 nm and with five of the solutions having PVP coated silver nanoplates having an absorption peak near 550 nm. A further sample was prepared without nanoplates as a control. Both nanoplates were obtained from a commercial supplier in a dispersion. After the overcoats were applied, the films were then cured under nitrogen at 0.8 J/cm$^2$ using a Heraeus DRS10/12QN Fusion UV System at 60% power with speed of 25 ft/min, after drying using a heat gun. Color measurements were obtained on the cured films, and the results are presented in Table 2. The haze values in % in Table 1 were averages across the film. As shown in Table 2, inclusion of the silver nanoplates significantly decreased b* without degrading other properties unacceptably, and b* decreased further with increasing concentration of silver nanoplates. Furthermore, a thicker overcoat lowered b* more at the same concentration of silver nanoplate. See FIG. 6.

TABLE 2

| Sample | Nanoplates (wt %) | Nanoplate Abs. Max. | Wet Thickness (mil) | % TT | % Haze | b* |
|---|---|---|---|---|---|---|
| Control | 0 | N/A | 1 | 91.7 | 0.90 | 1.56 |
| 1 | 0.0005 | 650 nm | 1 | 91.5 | 0.90 | 1.53 |
| 2 | 0.0010 | 650 nm | 1 | 91.0 | 0.83 | 1.38 |
| 3 | 0.0010 | 650 nm | 2 | 90.6 | 1.03 | 1.22 |
| 4 | 0.0020 | 650 nm | 1 | 90.7 | 0.86 | 1.26 |
| 5 | 0.0020 | 650 nm | 2 | 90.5 | 1.02 | 1.15 |
| 6 | 0.0030 | 650 nm | 1 | 90.5 | 0.80 | 1.15 |
| 7 | 0.0030 | 650 nm | 2 | 90.3 | 1.03 | 1.05 |
| 8 | 0.0010 | 550 nm | 1 | 91.4 | 0.94 | 1.37 |
| 9 | 0.0020 | 550 nm | 1 | 91.6 | 0.78 | 1.33 |
| 10 | 0.0020 | 550 nm | 2 | 90.6 | 0.85 | 1.15 |
| 11 | 0.0030 | 550 nm | 1 | 91.3 | 0.80 | 1.32 |
| 12 | 0.0030 | 550 nm | 2 | 90.2 | 0.91 | 1.07 |

Figure 7:
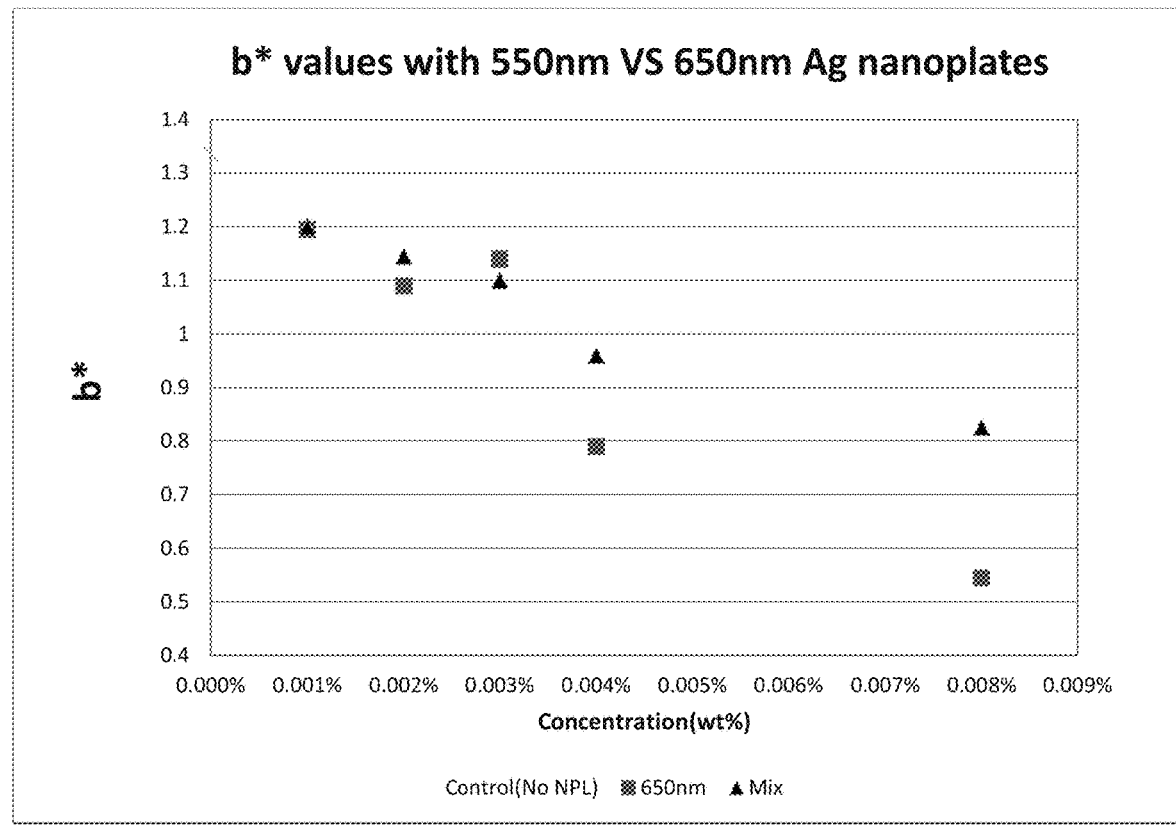
FIG. 7 is a plot of b* as a function of concentration in polymer overcoats over conductive fused metal nanostructured networks for silver nanoplates with two different absorption maxima as well as for a mixture of the two types of nanoplates along with a reference value for a coating without nanoplates.
Figure 8:
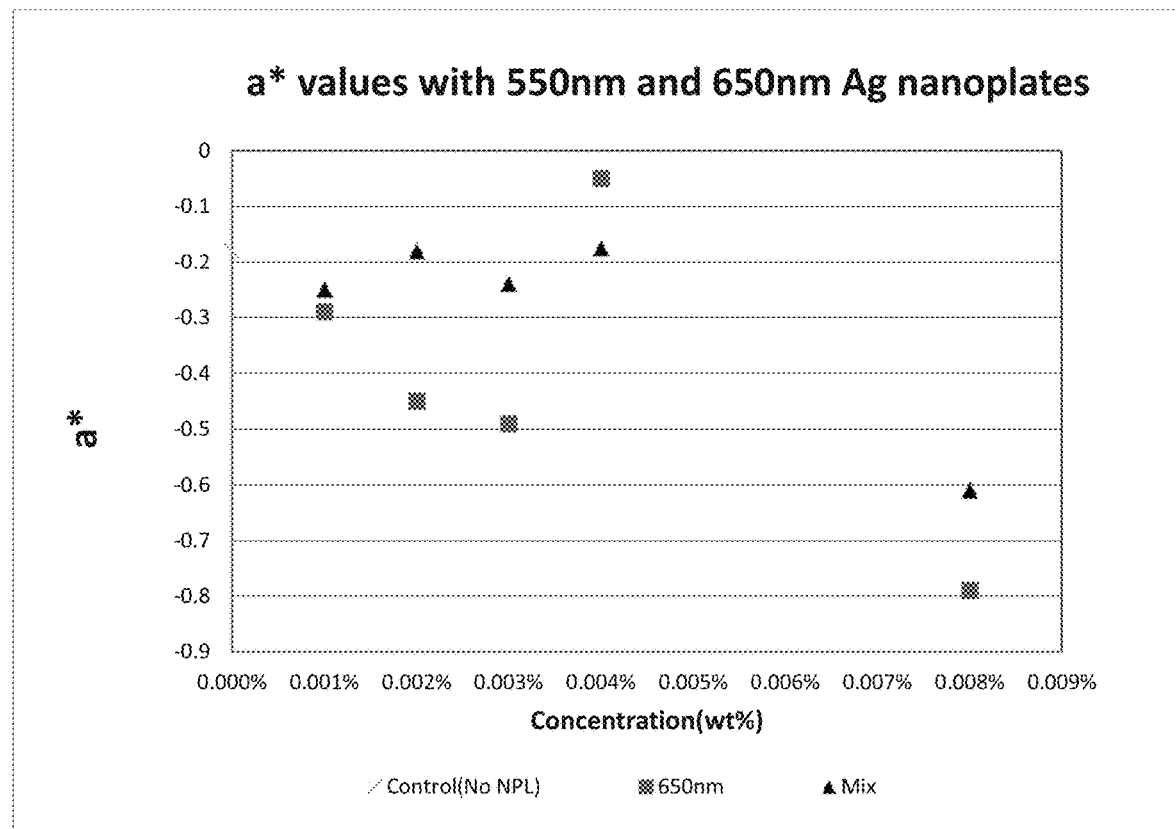
FIG. 8 is a plot of a* as a function of concentration in polymer overcoats over conductive fused metal nanostructured networks for silver nanoplates with two different absorption maxima as well as for a mixture of the two types of nanoplates along with a reference value for a coating without nanoplates.

A second set of samples were prepared with the second silver nanowire ink system (Supplier 2, AgNW-2). Coating solutions were prepared with a PGME solvent and a hardcoat polymer from Dexerials. The coating solutions had a polymer concentration of 0.5 wt % and were deposited with a 1 mil wet thickness. Along with a control sample free of nanoplates, ten solutions were formed in one of five polymer concentrations and with five solutions having 650 nm absorption PVP coated silver nanoplates, and five solutions having a combination of 550 nm and 650 nm absorption PVP coated silver nanoplates. The solutions were coated over a fused metal nanostructured network formed with the second silver nanowire ink system. Color measurements were obtained after drying and curing, and the results are presented in Table 3. The inclusion of the silver nanoplates significantly decreased b* without degrading other properties unacceptably. A comparison of the effects on b* and a* as a function of concentration of 650 nm nanoplates and mixed (500 nm and 650 nm) nanoplates are found in FIG. 7 and FIG. 8, respectively.

TABLE 3

| Sample | Nanoplates (wt %) | Nanoplate Abs. Max | % TT | % Haze | b* | a* |
|---|---|---|---|---|---|---|
| Control | 0 | N/A | 91.9 | 1.10 | 1.34 | −0.18 |
| 1 | 0.0010 | 650 nm | 91.5 | 0.98 | 1.12 | −0.29 |
| 2 | 0.0020 | 650 nm | 90.6 | 1.06 | 1.09 | −0.45 |
| 3 | 0.0030 | 650 nm | 90.7 | 1.05 | 1.14 | −0.49 |
| 4 | 0.0040 | 650 nm | 90.5 | 1.19 | 0.79 | −0.05 |
| 5 | 0.0080 | 650 nm | 89.6 | 0.97 | 0.55 | −0.79 |
| 6 | 0.0010 | 550 nm + 650 nm | 91.6 | 1.03 | 1.20 | −0.25 |
| 7 | 0.0020 | 550 nm + 650 nm | 91.1 | 1.08 | 1.15 | −0.18 |
| 8 | 0.0030 | 550 nm + 650 nm | 91.3 | 0.98 | 1.10 | −0.24 |
| 9 | 0.0040 | 550 nm + 650 nm | 91.0 | 1.00 | 0.96 | −0.18 |
| 10 | 0.0080 | 550 nm + 650 nm | 90.3 | 1.03 | 0.83 | −0.61 |

Figure 9:
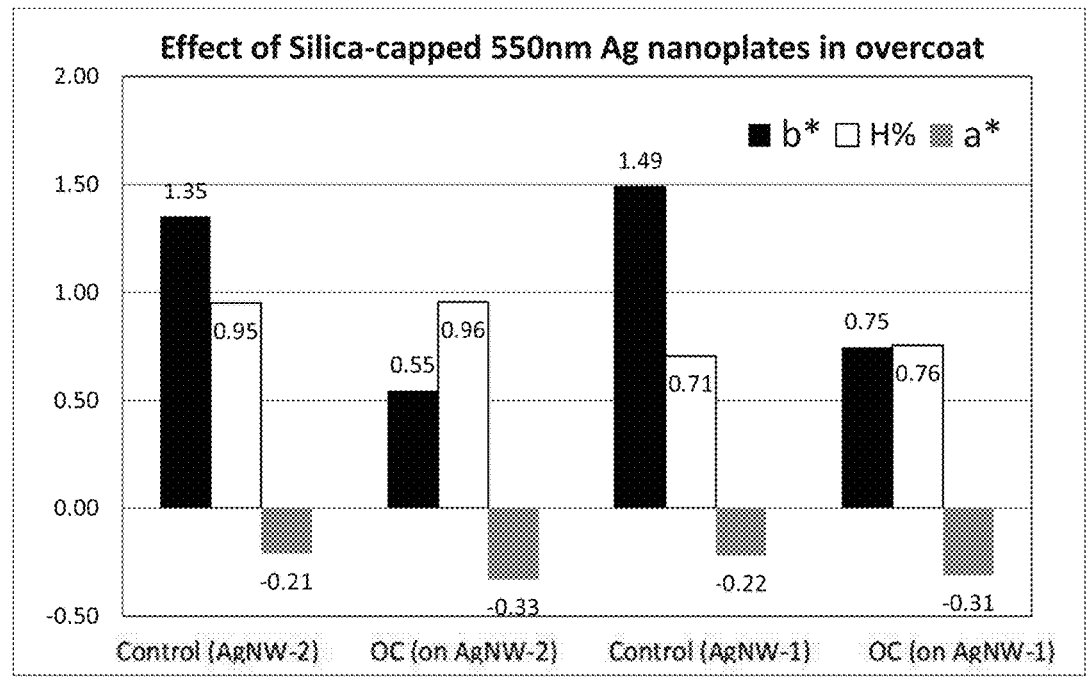
FIG. 9 is a histogram of optical parameters a*, b* and haze (H) in percent for samples with fused metal nanostructured networks formed with silver nanowires from two different suppliers with overcoats free of nanoplates (Control) or with silica coated nanoplates with a 550 nm absorption maximum in the overcoat.

Four additional samples were prepared with two samples formed with the first silver nanowire ink system (Supplier 1, AgNW-1) and two samples formed with the second silver nanowire ink system (Supplier 2, AgNW-2). Coating solutions were prepared with a PGME solvent, coating polymer from Dexerials and nanoplates. The coating solution had a polymer concentration of 0.5 wt %. The coating solutions were deposited onto the substrate by slot coating at 1 mil (25.4 microns) wet thickness. Two solutions comprised 0.004% wt of 550 nm absorbing silica coated silver nanoplates from a commercial supplier in a dispersion, and two coating solutions did not include any nanoplates. The solutions were coated over a fused metal nanostructured network formed with either the first or the second silver nanowire ink system. Color measurements were obtained after drying and curing, and the results are presented in Table 4. The inclusion of the 550 nm absorbing silica coated silver nanoplates significantly decreased b* and modestly increased the absolute value of a* without degrading other properties unacceptably. See FIG. 9.

TABLE 4

| Nanowire Supplier | Sample | % TT | % Haze | b* | a* |
|---|---|---|---|---|---|
| 1 | Control | 92.0 | 0.71 | 1.49 | −0.22 |
|   | 550 nm Silica coated Nanoplates | 90.4 | 0.76 | 0.75 | −0.31 |
| 2 | Control | 92.0 | 0.95 | 1.35 | −0.21 |
|   | 550 nm Silica coated Nanoplates | 90.1 | 0.96 | 0.55 | −0.33 |

Example 2

The Effect of Silver Nanoplates in a Conductive Ink

This example tests the optical properties of films having a fused metal nanostructured layers with silver nanoplates incorporated into the conductive layer.

A silver nanowire ink (AgNW-2) was prepared as described above except for the addition of 0.1 mL of 0.1 wt % nanoplate dispersions into silver nanowire inks. The nanoplate dispersions were initially dispersed in water prior to mixing into 5 mL of the silver nanowire ink. Control samples were also used without the nanoplates. The nanowire inks were slot coated at a wet thickness of 1.5 mils (43 microns) onto a PET film substrate and dried to fuse the nanowires into a fused metal nanostructured network forming a conductive layer. Two different metal nanowire ink systems were tested, and these ink systems relied on two different nanowire suppliers as noted in Example 1. For each ink system, 5 samples were made: one control and four samples with different silver nanoplates, two different sizes of nanoplates (650 nm peak absorption or 550 nm peak absorption) and two different coating materials (PVP or silica) on the nanoplates. The substrates with the fused metal nanostructured network had an initial haze prior to application of the overcoat of 1.12% with the first ink system and 1.28% with the second ink system. Color measurements, transmission and haze were compared between the films. The results are presented in Table 5 for the first silver nanowire system and in Table 6 for the second silver nanowire system. The haze values in percent in Tables 5 and 6 were averages across the film.

As shown in Table 5, inclusion of the silver nanoplates decreased b* without degrading other properties unacceptably. Specifically, inclusion of 550 nm absorbing nanoplates (both with PVP and silica coatings) did not significantly increase the absolute value of a*, but inclusion of 650 nm absorbing nanoplates (both PVP and silica-capped) showed a slightly larger but generally acceptable increase in the absolute value of a*. For b*, inclusion of 650 nm PVP coated silver nanoplates or 550 nm silica coated silver nanoplates moderately decrease b*, whereas 550 nm absorbing PVP coated silver nanoplates or 650 nm absorbing silica coated silver nanoplates shows a smaller decrease in b*.

TABLE 5

| Sample | % TT | % Haze | b* | a* |
|---|---|---|---|---|
| Control | 91.3 | 0.86 | 1.22 | −0.30 |
| 650 nm PVP coated Ag Nanoplates | 90.5 | 0.84 | 0.87 | −0.66 |
| 550 nm PVP coated Ag Nanoplates | 91.0 | 0.90 | 1.16 | −0.30 |
| 650 nm Silica coated Ag Nanoplates | 91.0 | 0.85 | 1.06 | −0.67 |
| 550 nm Silica coated Ag Nanoplates | 90.7 | 0.85 | 0.78 | −0.39 |

As shown in Table 6, inclusion of the silver nanoplates decreased b* and a* without degrading other properties unacceptably. Specifically, inclusion of 650 nm absorbing nanoplates (either coated with PVP or Silica) on fused metal nanostructured network moderately decreased the magnitude of b* without unacceptably increasing the magnitude of a* and slightly decreasing the haze. Inclusion of 550 nm absorbing PVP coated silver nanoplates in this ink system showed a slight effect on the color, but inclusion of 550 nm absorbing silica coated silver nanoplates exhibited a significant drop in the magnitude of b*, a small increase in a* and a decrease in haze.

TABLE 6

| Sample | % TT | % Haze | b* | a* |
|---|---|---|---|---|
| Control | 91.3 | 1.07 | 1.11 | −0.26 |
| 650 nm PVP coated Nanoplates | 90.5 | 1.05 | 0.86 | −0.64 |
| 550 nm PVP coated Nanoplates | 90.8 | 1.15 | 1.06 | −0.27 |
| 650 nm Silica coated Nanoplates | 90.9 | 1.06 | 0.86 | −0.65 |
| 550 nm Silica coated Nanoplates | 90.6 | 1.06 | 0.66 | −0.37 |

Figure 10:
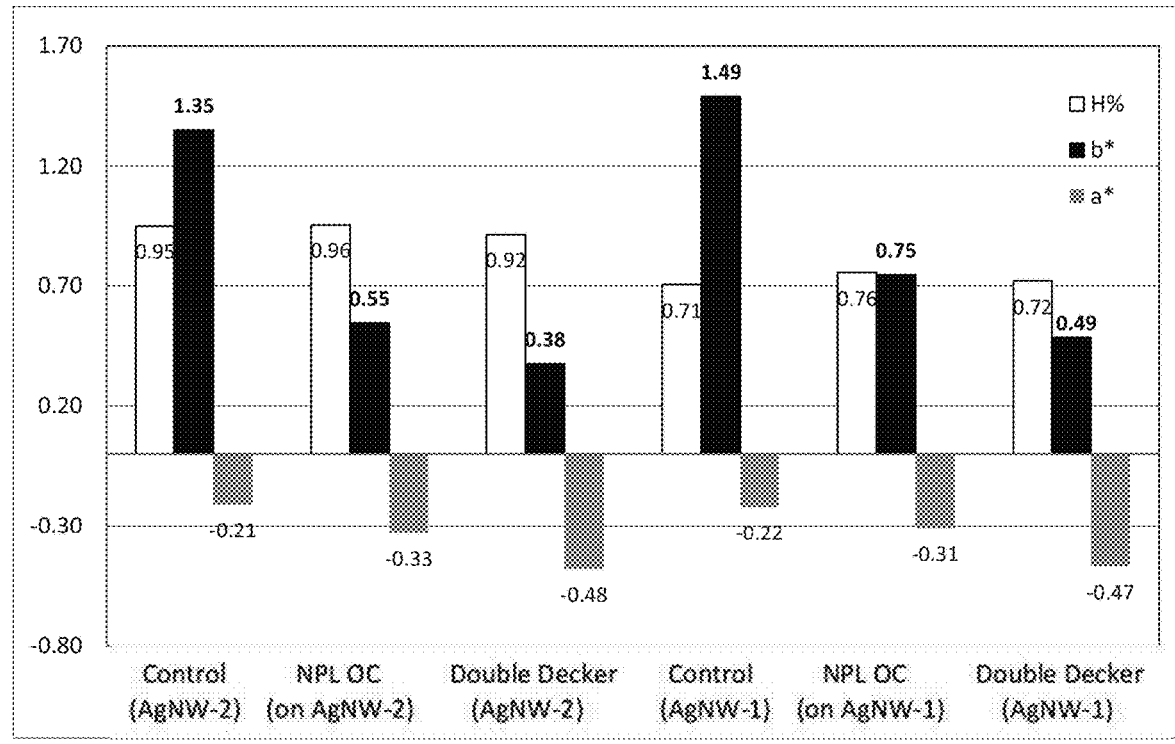
FIG. 10 is a histogram of optical parameters a*, b* and haze (H) in percent for samples with fused metal nanostructured networks formed with silver nanowires from two different suppliers with overcoats free of nanoplates, with silica coated nanoplates with a 550 nm absorption maximum in the overcoat or with silica coated nanoplates in both the polymer overcoat and in the conductive layer with the fused metal nanostructured network.

A further set of two samples were formed with 550 nm absorbing silica coated silver nanoplates with the nanoplates in both the over coat, as described in Example 1, and also in the sparse metal conductive layer as described above in this example. These double decker samples were prepared with one sample for the first ink system and one sample for the second ink system. The results are presented in Table 7 and FIG. 10 for values of haze, b* and a* with comparisons with a control with no nanoplates and corresponding samples with only nanoplates in the overcoat. The double decker samples exhibited some additional decrease in b* with a modest addition increase in the magnitude of a*. Haze decreased slightly in the double decker samples.

TABLE 7

| Sample | % TT | Sheet Resistance (ohm/sq) | % Haze | b* | a* |
|---|---|---|---|---|---|
| Ink 1 + Overcoat (No nanoplates) | 91.9 | 78 | 0.71 | 1.49 | −0.22 |
| Ink 1 Double Decker | 89.7 | 64 | 0.72 | 0.49 | −0.47 |
| Ink 2 + Overcoat (No nanoplates) | 91.9 | 70 | 0.95 | 1.35 | −0.21 |
| Ink 2 Double Decker | 89.6 | 71 | 0.96 | 0.38 | −0.48 |

Example 3

Overcoats with Gold Nanoshells

This example demonstrates the effectiveness of gold nanoshells in a coating over a fused metal nanostructured network to reduce the value of b*.

Figure 11:
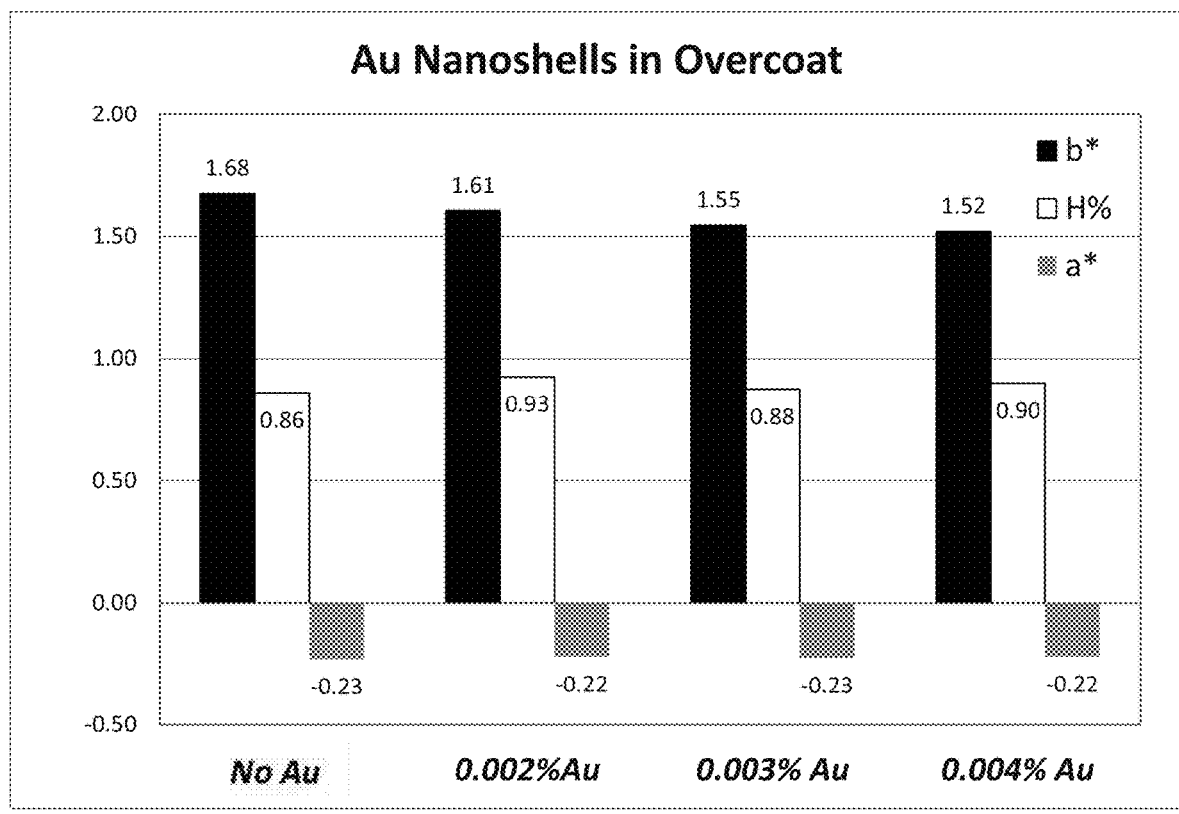
FIG. 11 is a histogram of optical parameters a*, b* and haze (H) in percent for samples with fused metal nanostructured networks with a polymer overcoat without gold nanoshells or with gold nanoshells at one of three different concentrations.

The substrates were coated with the first silver nanowire ink and dried to form a fused metal nanostructured network on the substrate. The overcoat solution was formed as described in Example 1 with a commercial hard coat polymer in PGME solvent at 0.5 weight percent except that gold nanoshells were added to the coating solutions. Four samples were prepared with one control and three different nanoshell concentrations. The nanoshells had a gold shell over a SiO2 core with an overall average primary particle size of about 100 nm. The overcoat solution was applied at a 1 mil wet thickness, dried and cured as described above. The optical results of the coated films is presented in Table 8 and FIG. 11. The gold nanoshells achieved a reduction of b* without increasing the magnitude of a*, with only a small increase in haze and a modest drop in total transmittance.

TABLE 8

| Concentration in Coating Solution | % TT | % Haze | b* | a* |
|---|---|---|---|---|
| 0 | 91.4 | 0.86 | 1.68 | −0.23 |
| 0.002 wt % Gold Nanoshells | 91.3 | 0.93 | 1.61 | −0.22 |
| 0.003 wt % of Gold Nanoshells | 91.3 | 0.88 | 1.55 | −0.23 |
| 0.004 wt % of Gold Nanoshells | 91.1 | 0.90 | 1.52 | −0.22 |

Example 4

Overcoats with Metal Nanoribbons

This Example demonstrates the effectiveness of silver nanoribbons to decrease b* of transparent conductive films.

Figure 12:
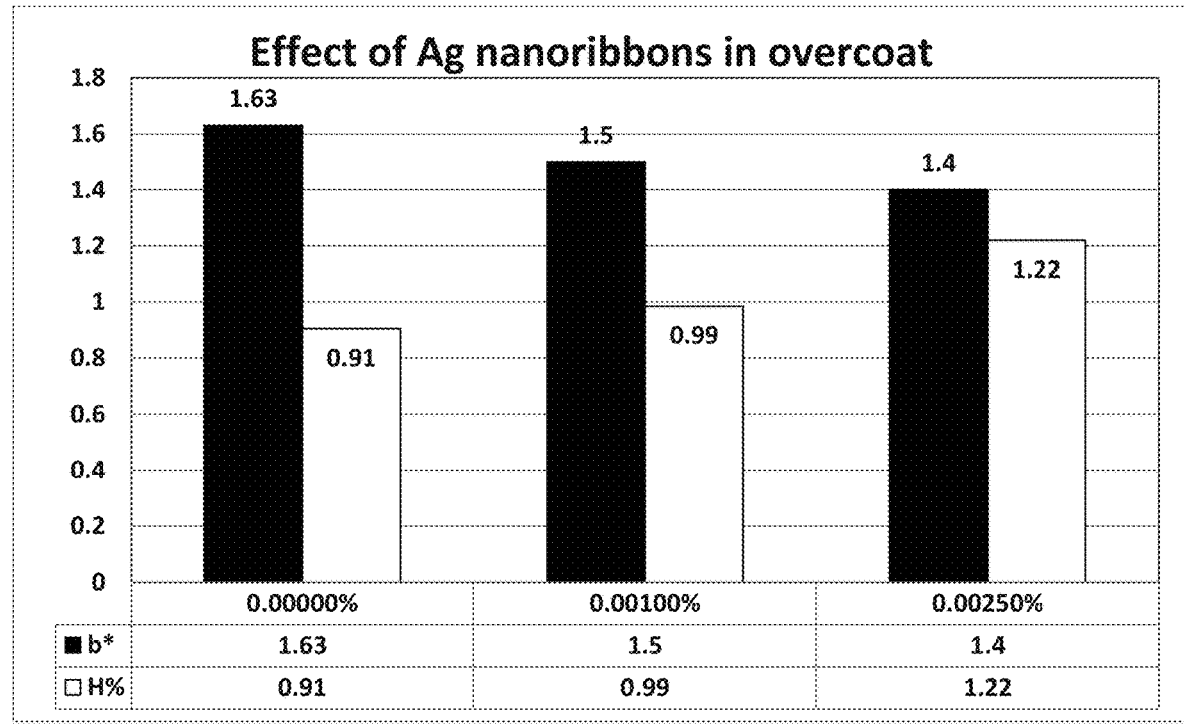
FIG. 12 is a histogram of optical parameters b* and haze in percent (H) for samples with a polymer overcoat over a fused metal conductive network for three samples, one free of metal nanoribbons and two with different concentrations of metal nanoribbons in the polymer overcoat.

The substrates were coated with the first silver nanowire ink and dried to form a fused metal nanostructured network on the substrate. The overcoat solution was formed as described in Example 1 with a commercial hard coat polymer in PGME solvent at 0.5 weight percent except that commercially obtained silver nanoribbons were added to the coating solutions. The silver nanoribbons had an average length of about 100 microns, an average width of about 20 nm, and an average thickness of about 10 nm. Three samples were prepared with one control and two different nanoribbon concentrations. The overcoat was applied at a 1 mil wet thickness, dried and cured as described above. The optical results of the coated films is presented in Table 9 and FIG. 12. The silver nanoribbons achieved a reduction of b* without a modest drop in total transmittance. The haze exhibited an increase especially at the higher concentration.

TABLE 9

| Nanoribbon Concentration | % TT | % Haze | b* |
|---|---|---|---|
| 0 | 91.4 | 0.91 | 1.63 |
| 0.001 wt % NanoRibbons | 91.3 | 0.99 | 1.50 |
| 0.0025 wt % NanoRibbons | 90.6 | 1.22 | 1.40 |

Example 5

Overcoats with Nanopigment

This example explores the effectiveness of nanopigment particles to lower the value of b* for transparent conductive films.

Figure 13:
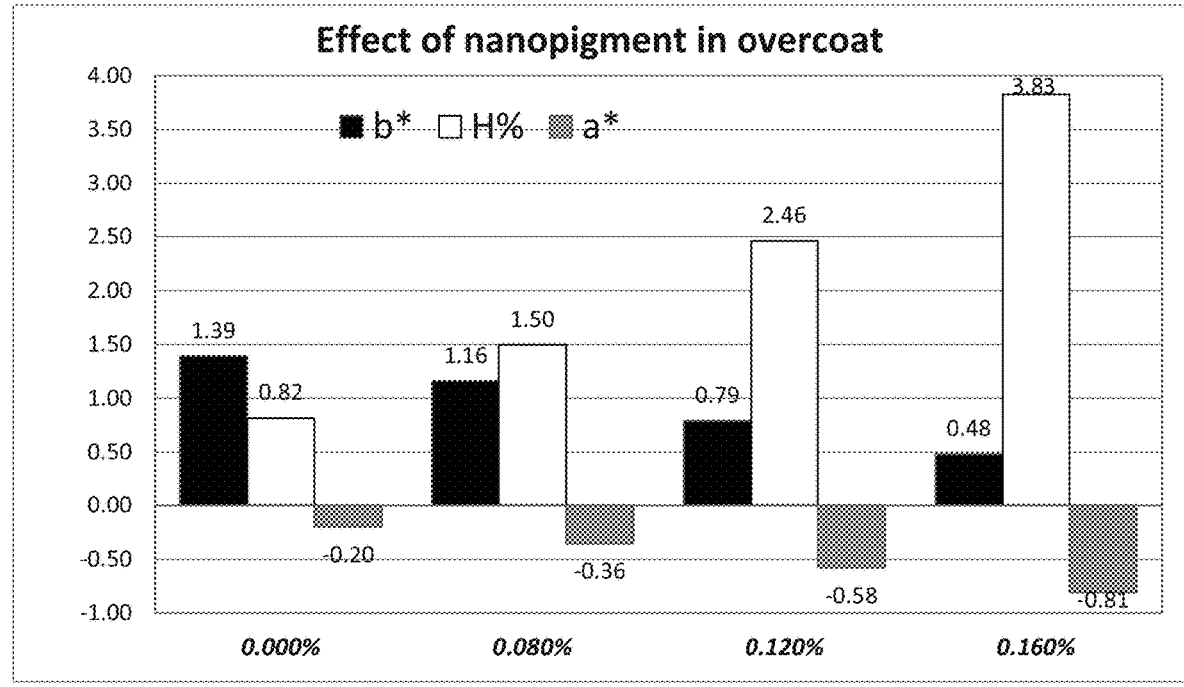
FIG. 13 is a histogram of optical parameters a*, b* and haze (H) in percent for four samples with fused metal nanostructured networks and a polymer overcoat with one control free of nanopigment and three samples with different concentrations of nanopigments.

The substrates were coated with the first silver nanowire ink and dried to form a fused metal nanostructured network on the substrate. The overcoat solution was formed as described in Example 1 with a commercial hard coat polymer in PGME solvent at 0.5 weight percent except that nanopigment particles were added to the coating solutions. The nanopigment dispersion was prepared according the literature procedure of Gotoh et al., Nanotechnology, (2007), 18, 345609, entitled "Simple synthesis of three primary colour nanoparticle inks of Prussian blue and its analogues", incorporated herein by reference. The nanopigment dispersion prepared was made at 0.1 wt % in water. Four samples were prepared with one control and three different nanopigment concentrations. The overcoat was applied at a 1 mil wet thickness, dried and cured as described above. The optical results of the coated films is presented in Table 10 and FIG. 13. The nanopigments in the overcoat achieved a good reduction of b*. However, a* exhibited a moderate change to more negative values and total transmission exhibited a moderate decrease. Also, the haze increased significantly, which may not be a concern for some applications. Also, with a broad range of commercial pigments known, it may be possible to select a nanopigment with desirable properties for certain applications.

TABLE 10

| Nanopigment Concentration | % TT | % Haze | b* | a* |
|---|---|---|---|---|
| 0 | 91.3 | 0.82 | 1.39 | −0.20 |
| 0.01 wt % Nanopigment | 90.5 | 1.50 | 1.16 | −0.36 |
| 0.02 wt % Nanopigment | 89.9 | 2.46 | 0.79 | −0.58 |
| 0.04 wt % Nanopigment | 88.6 | 3.83 | 0.48 | −0.81 |

Example 6

Overcoats with Gold Coated Silver Nanoplates

Silver nanoplates which showed absorption peak near 570 nm were coated with a thin layer of gold shell according to the procedure of Gao et al., Angew. Chem., Int. Ed., (2012), 51, 5620-5633, entitled "Highly Stable Silver Nanoplates for Surface Plasmon Resonance Biosensing", incorporated herein by reference. The gold coated silver nanoplates were then used in overcoating solutions onto transparent conductive layers on a PET substrate. In this example, the substrates were coated with the first silver nanowire ink and dried to form a fused metal nanostructured network on the substrate. The overcoat solutions were formed as described in Example 1 with two different commercial hard coat polymer in PGME solvent at 0.5 weight percent except that gold coated silver nanoplates were added to the coating solutions. Four samples were prepared, with one control and one gold coated silver nanoplates at about 0.0025 wt % in the coating solution, for each commercial hard coat polymer. The nanoplates exhibited an absorption peak near 530 nm in the solution. The overcoat solutions were applied at 1 mil wet thickness, dried and cured as described above. The optical results of the coated films are presented in Table 11. The gold coated silver nanoplates achieved a reduction of b* without increasing the magnitude of a*, with only a small decrease in transmission and no increase in haze.

TABLE 11

| | OPS | % TT | % H | b* | a* |
|---|---|---|---|---|---|
| OC-1 only | 54.7 | 91.1 | 0.84 | 1.56 | −0.20 |
| OC-1 + gold coated silver Nanoplates | 60.0 | 90.1 | 0.82 | 1.04 | −0.18 |
| OC-2 only | 58.3 | 91.4 | 0.84 | 1.64 | −0.18 |
| OC-2 + gold coated silver Nanoplates | 54.3 | 90.3 | 0.82 | 1.21 | −0.09 |

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A transparent conductive film comprising a substrate, a transparent conductive layer supported by the substrate, a coating and one or more nanoscale colorants, wherein a value of b* for the film is reduced at least about 0.1 units and total transmittance of visible light in percent is not decreased by more than about 2 relative to the corresponding film without the nanoscale colorants, wherein the nanoscale colorants comprise a metal nanoplate having an average thickness of no more than about 100 nanometers (nm) wherein the nanoscale colorants in a dilute dispersion have a peak absorption between 525 nm and 675 nm.

2. The transparent conductive film of claim 1 wherein the transparent conductive layer comprises a sparse metal conductive layer.

3. The transparent conductive film of claim 1 wherein the transparent conductive layer comprises a fused metal nanostructured network.

4. The transparent conductive film of claim 1 wherein the haze in percent units does not increase by more than 0.5 relative to the corresponding film without the nanoscale colorant.

5. The transparent conductive film of claim 1 having a total transmittance of visible light of at least about 85% and a haze of no more than about 1.2%, wherein the transparent conductive layer has a sheet resistance of no more than about 100 ohms/sq.

6. The transparent conductive film of claim 5 wherein the absolute value of b* and a* in the color scale are each no more than about 1.

7. The transparent conductive film of claim 1 wherein the nanoscale colorants are in the coating at a concentration from about 0.001 wt % to about 10 wt %.

8. The transparent conductive film of claim 1 wherein transparent conductive film comprises a sparse metal conductive layer and wherein the nanoscale colorants and a polymer binder are in the sparse metal conductive layer and the nanoscale colorants are at a concentration in the layer from about 0.1 wt % to about 50 wt %.

9. The transparent conductive film of claim 1 wherein the coating has from about 0.1 wt % to about 5 wt % nanoscale colorants.

10. The transparent conductive film of claim 1 wherein the coating comprises polysiloxanes, polysilsesquioxanes, polyurethanes, acrylic resins, acrylic copolymers, cellulose ethers and esters, nitrocellulose, other water insoluble structural polysaccharides, polyethers, polyesters, polystyrene, polyimide, fluoropolymer, styrene-acrylate copolymers, styrene-butadiene copolymers, acrylonitrile butadiene styrene copolymers, polysulfides, epoxy containing polymers, copolymers thereof, and mixtures thereof.

11. The transparent conductive film of claim 1 wherein the film is hue adjusted as expressed as an absolute value of the color scale a* being adjusted by at least about 0.1 relative to the equivalent film without the nanoscale colorants.

12. The transparent conductive film of claim 1 having a total transmittance of visible light of at least about 85% and a haze of no more than about 1.2%.

13. The transparent conductive film of claim 1 having a thickness from about 5 microns to about 1 mm.

14. A transparent conductive film comprising a substrate and a transparent conductive layer comprising a sparse metal conductive element and a polymer binder, wherein the transparent conductive layer comprises metal nanostructures having an absorption at 580 nm at least about 2 times the absorption at 475 nm, wherein the transparent conductive film has a value of b* lowered by at least about 0.1 and a value of % TT lowered by no more than about 2 relative to an equivalent transparent conductive layer without the metal nanostructures.

15. The transparent conductive film of claim 14 wherein the sparse metal conductive element comprises a fused metal nanostructured network and wherein the metal nanostructures may or may not be fused into the fused metal nanostructured network.

16. The transparent conductive film of claim 14 wherein the metal nanostructures comprise metal nanoplates, metal nanoshells or combinations thereof, which may be fused into the fused metal nanostructured network.

17. The transparent conductive film of claim 14 having a total transmittance of visible light of at least about 85% and absolute value of b* of no more than about 1.2 and a haze of no more than about 1.2%, and wherein the sparse metal conductive layer has a sheet resistance of no more than about 100 ohms/sq.

18. A coating solution comprising from about 0.02 wt % to about 80 wt % non-volatile polymer binder precursor compounds, from about 0.0001 wt % to about 2.5 wt % metal nanostructures, from about 0.01 wt % to about 1 wt % metal nanowires and solvent wherein the metal nanostructures have an absorption at 580 nm at least about 2 times the absorption at 475 nm.

19. The coating solution of claim 18 wherein the metal nanostructures comprise metal nanoplates, metal nanoshells, or metal nanoribbons or combinations thereof and wherein metal nanostructures in a dilute dispersion in water have a peak absorption between 525 nm and 675 nm.

20. The coating solution of claim 18 wherein the polymer comprises polysiloxanes, polysilsesquioxanes, polyurethanes, acrylic resins, acrylic copolymers, cellulose ethers and esters, nitrocellulose, other water insoluble structural polysaccharides, polyethers, polyesters, polystyrene, polyimide, fluoropolymer, styrene-acrylate copolymers, styrene-butadiene copolymers, acrylonitrile butadiene styrene copolymers, polysulfides, epoxy containing polymers, copolymers thereof, and mixtures thereof.

21. The coating solution of claim 18 wherein the solution can be coated to dry into a film with a thickness of no more than about 1 mm while having a total transmittance of visible light of at least 85% while adjusting the hue of the dried film as expressed as an absolute value of the color scale b*, a* or both being adjusted by at least about 0.1 relative to the equivalent film without the metal nanostructures.

22. A transparent conductive film comprising a substrate, a transparent conductive layer supported by the substrate, a coating and one or more nanoscale colorants, wherein a value of b* for the film is reduced at least about 0.1 units and total transmittance of visible light in percent is not decreased by more than about 2 relative to the corresponding film without the nanoscale colorants, wherein the transparent conductive layer comprises a fused metal nanostructured network.

23. The transparent conductive film of claim 22 wherein the nanoscale colorants comprise a metal nanoshell with a ceramic core having an average diameter of the primary particles of no more than about 100 nm.

24. The transparent conductive film of claim 22 wherein the haze in percent units does not increase by more than 0.5 relative to the corresponding film without the nanoscale colorant.

25. The transparent conductive film of claim 22 having a total transmittance of visible light of at least about 85% and a haze of no more than about 1.2%, wherein the transparent conductive layer has a sheet resistance of no more than about 100 ohms/sq.

26. The transparent conductive film of claim 25 wherein the absolute value of b* and a* in the color scale are each no more than about 1.

27. The transparent conductive film of claim 22 wherein the nanoscale colorants are in the coating at a concentration from about 0.001 wt % to about 10 wt %.

28. The transparent conductive film of claim 22 wherein the nanoscale colorants comprise metal nanoribbons.

29. The transparent conductive film of claim 22 wherein the coating has from about 0.1 wt % to about 5 wt % nanoscale colorants.

30. The transparent conductive film of claim 22 wherein the coating comprises polysiloxanes, polysilsesquioxanes, polyurethanes, acrylic resins, acrylic copolymers, cellulose ethers and esters, nitrocellulose, other water insoluble structural polysaccharides, polyethers, polyesters, polystyrene, polyimide, fluoropolymer, styrene-acrylate copolymers, styrene-butadiene copolymers, acrylonitrile butadiene styrene copolymers, polysulfides, epoxy containing polymers, copolymers thereof, and mixtures thereof.

31. The transparent conductive film of claim 22 wherein the film is hue adjusted as expressed as an absolute value of the color scale a* being adjusted by at least about 0.1 relative to the equivalent film without the nanoscale colorants.

* * * * *